US008749455B2

(12) United States Patent
Koyama

(10) Patent No.: US 8,749,455 B2
(45) Date of Patent: Jun. 10, 2014

(54) DISPLAY DEVICE AND ELECTRONIC EQUIPMENT USING THE SAME

(75) Inventor: Jun Koyama, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 13/535,962

(22) Filed: Jun. 28, 2012

(65) Prior Publication Data

US 2012/0267634 A1 Oct. 25, 2012

Related U.S. Application Data

(63) Continuation of application No. 12/890,853, filed on Sep. 27, 2010, now Pat. No. 8,232,937, which is a continuation of application No. 11/703,980, filed on Feb. 8, 2007, now Pat. No. 7,804,467, which is a continuation of application No. 11/010,966, filed on Dec. 13, 2004, now Pat. No. 7,176,859, which is a continuation of application No. 10/215,092, filed on Aug. 8, 2002, now Pat. No. 6,876,350.

(30) Foreign Application Priority Data

Aug. 10, 2001 (JP) ................................ 2001-244651

(51) Int. Cl.

| | |
|---|---|
| ***G09G 3/30*** | (2006.01) |
| ***G09G 5/00*** | (2006.01) |
| ***G09G 5/10*** | (2006.01) |
| ***G06F 3/038*** | (2013.01) |

(52) U.S. Cl.

USPC .............................. 345/76; 345/214; 345/690

(58) Field of Classification Search

None

See application file for complete search history.

(56) References Cited

U.S. PATENT DOCUMENTS

| | | | |
|---|---|---|---|
| 5,367,179 | A | 11/1994 | Mori et al. |
| 5,684,365 | A | 11/1997 | Tang et al. |
| 5,811,835 | A | 9/1998 | Seiki et al. |
| 5,952,789 | A | 9/1999 | Stewart et al. |
| 5,990,629 | A | 11/1999 | Yamada et al. |
| 6,023,259 | A | 2/2000 | Howard et al. |
| 6,091,203 | A | 7/2000 | Kawashima et al. |
| 6,163,314 | A | 12/2000 | Lin |

(Continued)

FOREIGN PATENT DOCUMENTS

| | | |
|---|---|---|
| EP | 0 717 446 A2 | 6/1996 |
| EP | 1 102 234 A2 | 5/2001 |

(Continued)

OTHER PUBLICATIONS

Smith et al, *Micro-Electronics Circuits*, Chapter 6.7: MOS Differential Amplifiers, 1991, pp. 447-456.

(Continued)

*Primary Examiner* — Seokyun Moon
(74) *Attorney, Agent, or Firm* — Husch Blackwell LLP

(57) ABSTRACT

In an active matrix EL display device, pixels which are suitable for a constant current drive are structured. The pixel includes a first switch which has one end connected to a source signal line and the other end connected to a current-voltage conversion element, a second switch which has one end connected to the current-voltage conversion element and the other end connected to a voltage holding capacitor and to a voltage-current conversion element, and a pixel electrode connected to the current-voltage conversion element and to the voltage-current conversion element.

12 Claims, 12 Drawing Sheets

(56) References Cited

U.S. PATENT DOCUMENTS

| | | | |
|---|---|---|---|
| 6,229,506 | B1 | 5/2001 | Dawson et al. |
| 6,268,842 | B1 | 7/2001 | Yamazaki et al. |
| 6,307,322 | B1 | 10/2001 | Dawson et al. |
| 6,331,844 | B1 | 12/2001 | Okumura et al. |
| 6,351,078 | B1 | 2/2002 | Wang et al. |
| 6,359,605 | B1 | 3/2002 | Knapp et al. |
| 6,366,116 | B1 | 4/2002 | Juang |
| 6,373,454 | B1 | 4/2002 | Knapp et al. |
| 6,452,341 | B1 | 9/2002 | Yamauchi et al. |
| 6,486,606 | B1 | 11/2002 | Ting |
| 6,501,466 | B1 | 12/2002 | Yamagishi et al. |
| 6,535,185 | B2 | 3/2003 | Kim et al. |
| 6,684,365 | B1 | 1/2004 | Murayama |
| 6,686,699 | B2 | 2/2004 | Yumoto |
| 6,690,115 | B2 | 2/2004 | Kim et al. |
| 6,859,193 | B1 | 2/2005 | Yumoto |
| 2001/0004190 | A1* | 6/2001 | Nishi et al. .................... 313/506 |
| 2001/0022565 | A1 | 9/2001 | Kimura |
| 2001/0045929 | A1 | 11/2001 | Prache et al. |
| 2001/0055828 | A1 | 12/2001 | Kaneko et al. |
| 2002/0014852 | A1* | 2/2002 | Bae ............................ 315/169.3 |
| 2002/0126073 | A1 | 9/2002 | Knapp et al. |
| 2002/0135313 | A1 | 9/2002 | Koyama |
| 2002/0180369 | A1 | 12/2002 | Koyama |
| 2003/0062524 | A1 | 4/2003 | Kimura |
| 2005/0190177 | A1 | 9/2005 | Yumoto |

FOREIGN PATENT DOCUMENTS

| | | | |
|---|---|---|---|
| EP | 1 130 565 | A1 | 9/2001 |
| JP | 08-234683 | | 9/1996 |
| JP | 10-214060 | | 8/1998 |
| JP | 11-282419 | | 10/1999 |
| JP | 2000-040924 | | 2/2000 |
| JP | 2000-056847 | | 2/2000 |
| JP | 2000-138572 | | 5/2000 |
| JP | 2000-267164 | | 9/2000 |
| JP | 2001-042826 | | 2/2001 |
| JP | 2001-111060 | | 4/2001 |
| JP | 2001-147659 | | 5/2001 |
| JP | 2001-216029 | | 8/2001 |
| JP | 2001-324958 | | 11/2001 |
| JP | 2002-518691 | | 6/2002 |
| JP | 2002-358049 | | 12/2002 |
| WO | WO 98/33165 | A1 | 7/1998 |
| WO | WO 99/65012 | A2 | 12/1999 |
| WO | WO 01/06484 | A1 | 1/2001 |

OTHER PUBLICATIONS

Dawson, R.M.A. et al, "The Impact of the Transient Response of Organic Light Emitting Diodes on the Design of Active Matrix OLED Displays," IEDM '98, 1998, pp. 875-878.

Dawson, R.M.A. et al, "4.2: Design of an Improved Pixel for a Polysilicon Active-Matrix Organic LED Display," SID '98 Digest, vol. 29, 1998, pp. 11-14.

Baldo, M.A. et al, "Highly Efficient Phosphorescent Emission from Organic Electroluminescent Devices," Nature, vol. 395, Sep. 10, 1998, pp. 151-154.

Dawson, R.M.A. et al, "31.3: A Poly-Si Active-Matrix OLED Display with Integrated Drivers," SID '99 Digest, vol. 30, 1999, pp. 438-441.

Baldo, M.A. et al, "Very High-Efficiency Green Organic Light-Emitting Devices Based on Electrophosphorescence," Applied Physics Letters, vol. 75, No. 1, Jul. 5, 1999, pp. 4-6.

Tsutsui, T. et al, "High Quantum Efficiency in Organic Light-Emitting Devices with Iridium-Complex as a Triplet Emissive Center," Japanese Journal of Applied Physics, vol. 38, part 2, No. 12B, Dec. 15, 1999, pp. L1502-L1504.

Hunter, I.M. et al, "Active Matrix Addressing of Polymer Light Emitting Diodes Using Low Temperature Poly Silicon TFTs," AM-LCD 2000, 2000, pp. 249-252.

Kimura, M. et al, "Low-Temperature Poly-Si TFT Display Using Light-Emitting-Polymer," AM-LCD 2000, 2000, pp. 245-248.

Bae, S.J. et al, "A Novel Pixel Design for an Active Matrix Organic Light Emitting Diode Display," SID '00 Digest, vol. 31, 2000, pp. 358-361.

Yumoto, A. et al, "Pixel-Driving Methods for Large-Sized Poly-Si AM-OLED Displays," Asia Display/IDW '01, 2001, pp. 1395-1398.

* cited by examiner

DISPLAY DEVICE AND ELECTRONIC EQUIPMENT USING THE SAME

This application is a continuation of copending U.S. application Ser. No. 12/890,853, filed on Sep. 27, 2010 which is a continuation of U.S. application Ser. No. 11/703,980, filed on Feb. 8, 2007 (now U.S. Pat. No. 7,804,467 issued Sep. 28, 2010) which is a continuation of U.S. application Ser. No. 11/010,966, filed on Dec. 13, 2004 (now U.S. Pat. No. 7,176, 859) issued Feb. 13, 2007) which is a continuation of U.S. application Ser. No. 10/215,092, filed on Aug. 8, 2002 (now U.S. Pat. No. 6,876,350 issued Apr. 5, 2005).

BACKGROUND OF THE INVENTION

1. Field of the Invention

The present invention relates to a display device, particularly, to an OLED display device using a thin film transistor formed on the transparent substrate such as glass or plastic. Further, it relates to an electronic device using the display device.

2. Description of the Related Art

In resent years, a cellular phone has been becoming popular by developing communication technology. In future, electrical transmission of moving pictures and transmission of a large quantity of information will be expected. With being lightened, a mobile personal compute is into production. An information device called a personal digital assistant (PDA) developed from electrical books is produced and becoming popular. With developing a display device and the like, most of such portable information devices are equipped with flat displays.

The latest technology aims at using an active matrix display device as a display device used in the portable information device.

In the active matrix display device, TFTs (thin film transistors) are provided in correspondence with respective pixels to control pictures. The active matrix display device has an advantages that the high definition of images is possible, the improvement of image quality is possible, the correspondence to moving image is possible, and the like, compared to a passive matrix display device. Therefore, the display device of the portable information device will be changed from a passive matrix type to an active matrix type.

Above all, a display device using low-temperature polysilicon has been production in recent years. In the low-temperature polysilicon technology, the driver circuit using TFTs can be formed simultaneously in the periphery of a pixel portion in addition to a pixel TFT that constitutes a pixel. Thereby, the low-temperature polysilicon technology can contribute to miniaturization of devices and low power consumption. Accordingly, the low-temperature polysilicon device become indispensable to the display device of the mobile device which has been widely applied to various fields in recent years.

In recent years, the development of a display device using an organic electro luminescence elements (OLED elements has been becoming more and more active. Hereinafter, the OLED element includes both the OLED element using luminescence from singlet exciton (fluorescence) and the OLED element using luminescence from triplet exciton (phosphorescence) here. In this specification, the OLED element is described as an example of a light emitting element, however, another light emitting elements can be used.

The OLED element has a structure in which an OLED layer is interposed between a pair of electrodes (an anode and a cathode), and usually has a laminated structure. Representatively, there is a laminated structure which is called "hole transporting layer/light emitting layer/electron transporting layer", proposed by Tang et al. of Kodak Eastman Company.

Other structures may also be adopted, such as a structure in which "a hole injecting layer, a hole transporting layer, a light emitting layer and an electron transporting layer" are stacked on an anode in order, or a structure in which "a hole injecting layer, a hole transporting layer, a light emitting layer, an electron transporting layer and an electron injecting layer" are laminated on an anode in order. The light emitting layer may also be doped with a fluorescent pigment or the like.

In this specification, all layers provided between a cathode and an anode are herein generically called "OLED layer". Accordingly, all the aforementioned hole injecting layer, hole transporting layer, light emitting layer, electron transporting layer and electron injecting layer are encompassed in the OLED layer. A light emitting element constituted of an anode, an OLED layer, and a cathode is called "OLED element".

FIG. 5 shows an example of the construction of a pixel portion of an active matrix type OLED display device. A gate signal line (G1 to Gy) to which a selection signal is to be inputted from a gate signal line driver circuit is connected to a gate electrode of a switching TFT 301 which is provided in each pixel of the pixel portion. Either one of source and drain regions of the switching TFT 301 provided in each pixel is connected to a source signal line (S1 to Sx) to which a signal is to be inputted from a source signal line driver circuit, while the other is connected to a gate electrode of an OLED driving TFT 302 and to either one of electrodes of a capacitor 303 which is provided in each pixel. The other electrode of the capacitor 303 is connected to a power supply line (V1 to Vx). Either one of source and drain regions of the OLED driving TFT 302 provided in each pixel is connected to the power supply line (V1 to Vx), while the other is connected to one of electrodes of the OLED element 304 provided in each pixel.

The OLED element 304 has an anode, a cathode and an OLED layer provided between the anode and the cathode. If the anode of the OLED element 304 is connected to the source region or the drain region of the OLED driving TFT 302, the anode and the cathode of the OLED element 304 become a pixel electrode and a counter electrode, respectively. Contrarily, if the cathode of the OLED element 304 is connected to the source region or the drain region of the OLED driving TFT 302, the cathode and the anode of the OLED element 304 become a pixel electrode and a counter electrode, respectively.

Incidentally, the potential of the counter electrode is herein called "counter potential", and a power source for applying the counter potential to the counter electrode is herein called "counter power source". The difference between the potential of the pixel electrode and the potential of the counter electrode is an OLED driving voltage, and the OLED driving voltage is applied to the OLED layer.

As a gray scale display method for the above-described EL display device, there are an analog gray scale method and a time gray scale method.

First, the analog gray scale method for the OLED display device will be described below. FIG. 6 is a timing chart showing the case driving the display device shown in FIG. 5 by the analog gray scale method. The period that starts when one gate signal is selected and finishes when the next gate signal line is selected is herein called "one line period (L)". The period that starts when one image is selected and finishes when the next image is selected corresponds to one frame period. In the case of the OLED display device shown in FIG.

5, the number of gate signal lines is "y", and y-number of line periods (L1 to Ly) are provided in one frame period.

As resolution of the OLED display device becomes higher, the number of line periods for one frame period becomes larger, and the driver circuit of the OLED display device must be driven at a higher frequency.

The power source lines (V1 to Vx) are kept at a constant voltage (power source potential). In addition, the counter potential is kept constant. The counter potential has a potential difference from the power source potential so that the OLED elements emit light.

In the first line period (L1), a selection signal from the gate signal line driver circuit is inputted to the gate signal line G1. Then, analog video signals are inputted to the source signal lines (S1 to Sx) in order.

Since all the switching TFTs 301 connected to the gate signal line G1 are turned on, the analog video signals inputted to the source signal lines (S1 to Sx) are respectively inputted to the gate electrodes of the OLED driving TFTs 302 via the switching TFTs 301.

According to the potential of the analog video signal inputted into the pixel when the switching TFT 301 is turned on, the gate voltage of the OLED driving TFT 302 varies. At this time, the drain current of the OLED driving TFT 302 to the gate voltage is determined at a 1-to-1 ratio in accordance with the Id-Vg characteristic of the OLED driving TFT 302. Specifically, according to the potential of the analog video signal inputted to the gate electrode of the OLED driving TFT 302, the potential of the drain region of the OLED driving TFT 302 (an OLED driving voltage which is corresponding to the on state) is determined, a predetermined drain current flows into the OLED element 304, and the OLED element 304 emits light at the amount of emission which is corresponding to the amount of the drain current.

When the above-described operation is repeated until the termination of inputting the analog video signals to the respective source signal lines (S1 to Sx), the first line period (L1) terminates. Incidentally, one line period may also be defined as the sum of the period required until the termination of inputting the analog video signals to the respective source signal lines (S1 to Sx) and a horizontal retrace period. Then, the second line period (L2) starts, and a selection signal is inputted to the gate signal line G2. Similarly to the first line period (L1), analog video signals are inputted to the source signal lines (S1 to Sx) in order.

When selection signals are inputted to all the gate signal lines (G1 to Gy), all the line periods (L1 to Ly) terminate. When all the line periods (L1 to Ly) terminate, one frame period terminates. During one frame period, all the pixels perform displaying and one image is formed. Incidentally, one frame period may also be defined as the sum of all the line periods (L1 to Ly) and a vertical retrace period.

As described above, the amount of emission of the OLED element is controlled by the analog video signal, and gray scale display is provided by controlling the amount of emission. In the analog gray scale method, gray scale display is carried out by the variation in the potentials of the respective analog video signals inputted to the source signal lines.

The time gray scale method will be described below.

In the time gray scale method, digital signals are inputted to pixels to select a emitting state or a non-emitting state of the respective OLED elements, whereby gray scales are represented by accumulating periods per frame period during which each of the OLED elements emits.

In the following description, $2^n$ gray scales (n is a natural number) are represented. FIG. 7 is a timing chart showing the case of driving the display device shown in FIG. 5 by the time gray scale method. One frame period is divided into n-number of sub-frame periods ($SF_1$ to $SF_n$). Incidentally, the period for which all the pixels in the pixel portion display one image is called "one frame period (F)". Plural periods into which one frame period is divided are called "sub-frame periods", respectively. As the number of gray scales increases, the number into which one frame period is divided also increases, and the driver circuit of the OLED display device must be driven at a higher frequency.

One sub-frame period is divided into a write period (Ta) and a display period (Ts). The write period is a period for which digital signals are inputted to all the pixels during one sub-frame period, and the display period (also called "lighting period") is a period for which the respective OLED display devices are in an emitting state or a non-emitting state in accordance with the input digital signals, thereby perform displaying.

The OLED driving voltage shown in FIG. 7 represents the OLED driving voltage of an OLED element for which the emitting state is selected. Specifically, the OLED driving voltage of the OLED element for which the emitting state is selected is 0 V during the write period, and has a magnitude which enables the OLED element to emit light, during the display period.

The counter potential is controlled by an external switch (not shown) so that the counter potential is kept at approximately the same level as the power source potential during the write period, and has, during the display period, a potential difference from the power source potential to so that the OLED element emits light.

The write period and the display period of each sub-frame period will first be described in detail with reference to FIGS. 5 and 7, and subsequently, the time gray scale method will be described.

First, a gate signal is inputted to the gate signal line G1, and all the switching TFTs 301 connected to the gate signal line G1 are turned on. Then, digital signals are inputted to the source signal lines (S1 to Sx) in order. The counter potential is kept at the same level as the potential of the power supply lines (V1 to Vx) (power source potential). Each of the digital signals has information of "0" or "1", that is, each of the digital signals of "0" or "1" has a voltage of high level or low level.

Then, the digital signals inputted to the source signal lines (S1 to Sx) are respectively inputted to the gate electrodes of the OLED driving. TFTs 302 via the switching TFTs 301 which are in the on state. The respective digital signals are also inputted to the capacitors 303 and stored.

Then, the above-described operation is repeated by inputting gate signals to the respective gate signal lines (G2 to Gy) in order, whereby digital signals are inputted to all the pixels and the input digital signal is held in each of the pixels. The period required until the digital signals are inputted to all the pixels is called "write period".

When the digital signals are inputted to all the pixels, all the switching TFTs 301 are turned off. Thus, the external switch (not shown) connected to the counter electrode causes the counter potential to vary so that a potential difference that enables the OLED element 304 to emit light is produced between the counter potential and the power source potential.

In the case where the digital signals have information of "0", the OLED driving TFTs 302 are turned off and the OLED elements 304 do not emit light. Contrarily, in the case where the digital signals have information of "1", the OLED driving TFTs 302 are turned on. Consequently, the pixel electrodes of the respective OLED elements 304 are kept at approximately the same potential as the power source potential, and the OLED elements 304 emit light. In this manner, the emitting state or the non-emitting state of the OLED elements 304 is selected in accordance with the information of the digital signals, and all the pixels perform displaying at the same time. When all the pixels perform display, an image is formed. The period for which the pixels perform displaying is called "display period".

The lengths of the write periods ($T_{a1}$ to $T_{an}$) of all the n-number of sub-frame periods ($SF_1$ to $SF_n$) are the same. The display periods (Ts) of the respective sub-frame periods ($SF_1$ to $SF_n$) are denoted by $T_{s1}$ to $T_{sn}$.

The lengths of the respective display periods are set to become $T_{s1}:T_{s2}:T_{s3}: \ldots :T_{2(n-1)}:T_{sn}=2^0:2^{-1}:2^2: \ldots :2^{(n-2)}:2^{-(n-1)}$, respectively. By combining desired ones of these display periods, it is possible to provide a desired gray scale of $2^n$ gray scales.

The display period is any one of $T_{s1}$ to $T_{sn}$. Here, it is assumed that predetermined pixels are turned on for $T_{s1}$.

Then, when the next write period starts and data signals are inputted to all the pixels, the next display period starts. At this time, the display period is any one of $T_{s2}$ to $T_{sn}$. Here, it is assumed that predetermined pixels are turned on for $T_{s2}$.

The same operation is repeated as to the remaining (n−2)-number of sub-frames, whereby the display periods are set as $T_{s3}, T_{s4}, \ldots, T_{sn}$ in order and predetermined pixels are turned on during each of the sub-frames.

When the n-number of sub-frame periods appear, one frame period terminates. At this time, the gray scale of a pixel is determined by cumulatively calculating the length of the display periods for which the pixel is turned on. For example, assuming that n=8 and the obtainable luminance in the case where the pixel emits light for all the display periods is 100%, a luminance of 75% can be represented if the pixel emits light during $T_{s1}$ and $T_{s2}$ and a luminance of 16% can be realized if $T_{s3}$, $T_{s5}$ and $T_{s8}$ are selected.

Incidentally, in the driving method of the time gray scale method which represents gray scales by inputting n-bit digital signals, the number of plural sub-frame periods into which one frame period is divided, and the lengths of the respective sub-frame periods and the like are not limited to the above-described examples.

The conventional OLED display device as described above has the following problems.

A voltage is supplied to a pixel from a source signal line, and the voltage is converted into a current by an OLED driving TFT. Thus, even if the same voltage is input, different currents flow to OLED elements due to dispersion of performance between the OLED driving TFTs, and the fact that luminance of the pixel differs in a different location causes unevenness of display. For example, when the thickness of a gate insulating film differs within a substrate, an on current of the OLED driving TFT differs in a different location. As a result, the emission luminance of the OLED element differs to cause unevenness of display. This defect is a more serious problem as a panel is increased in size.

SUMMARY OF THE INVENTION

The present invention has been made in view of the above, and an object of the present invention is therefore to reduce unevenness of display in a screen in a display device that uses an OLED element.

In order to solve the aforementioned problems, the present invention uses the following means.

According to the present invention, there is provided an active matrix display device comprising a plurality of pixels, a plurality of source signal lines, and a plurality of gate signal lines, characterized in that each of the plurality of pixels comprises:

- means for inputting a first current from the source signal line to the pixel;
- means for converting the input first current into a voltage;
- means for inputting the voltage to holding means; and
- means for supplying a second current in accordance with the voltage to a light emitting element.

According to the present invention, there is provided an active matrix display device comprising a plurality of pixels, a plurality of source signal lines, and a plurality of gate signal lines, characterized in that each of the plurality of pixels comprises:

- a first switch comprising one end connected to the source signal line and the other end connected to a current-voltage conversion element;
- a second switch comprising one end connected to the current-voltage conversion element and the other end connected to holding means and to a voltage-current conversion element;
- a pixel electrode connected to the current-voltage conversion element and to the voltage-current conversion element; and
- a light emitting element which uses the pixel electrode as one of electrodes thereof.

According to the present invention, there is provided an active matrix display device comprising a plurality of pixels, a plurality of source signal lines, and a plurality of gate signal lines, characterized in that each of the plurality of pixels comprises:

- a first switch comprising one end connected to the source signal line and the other end connected to a drain terminal of a first thin film transistor;
- a second switch comprising one end connected to a gate terminal and the drain terminal of the first thin film transistor and the other end connected to holding means and to a gate terminal of a second thin film transistor;
- a pixel electrode connected to a source terminal of the first thin film transistor and to a source terminal of the second thin film transistor; and
- a light emitting element which uses the pixel electrode as one of electrodes thereof.

According to the present invention, there is provided an active matrix display device comprising a plurality of pixels, a plurality of source signal lines, and a plurality of gate signal lines, characterized in that each of the plurality of pixels comprises:

- a first switch comprising one end connected to the source signal line and the other end connected to a drain terminal of a first thin film transistor;
- a second switch comprising one end connected to the drain terminal of the first thin film transistor and the other end connected to a gate terminal of the first thin film transistor, to holding means, and to a gate terminal of a second thin film transistor;
- a pixel electrode connected to a source terminal of the first thin film transistor and to a source terminal of the second thin film transistor; and
- a light emitting element which uses the pixel electrode as one of electrodes thereof.

A display device provided according to the present invention is characterized in that each of the source terminal of the first thin film transistor and the source terminal of the second thin film transistor are connected to the pixel electrode through a resistor.

A display device provided according to the present invention is characterized in that the first switch and the second switch are controlled by the same gate signal line.

A display device provided according to the present invention is characterized in that the first switch and the second switch are controlled by different gate signal lines.

A display device provided according to the present invention is characterized in that the first thin film transistor and the second thin film transistor have different gate widths.

A display device provided according to the present invention is characterized in that thin film transistors in the display device are of a single polarity type, particularly of an n-type, and the pixel electrode is an anode of an OLED element.

An electronic device which uses the aforementioned display device is provided by the present invention.

With taking the aforementioned structures, unevenness in a screen can be decreased by the following reasons.

In the conventional pixel, voltage is converted into current, and the current changes with variations in the conversion efficiency of an element even if the same voltage is input. In the present invention, current is input to convert into voltage, the converted voltage is held, and the held voltage is again converted into current. By producing a current-voltage conversion element and a voltage-current conversion element, which are close to each other, in a small pixel region, characteristics of the elements can be arranged and variations in conversion and reverse conversion can be reduced. Therefore, the accuracy of the current obtained improves and it is possible to reduce unevenness.

DETAILED DESCRIPTION OF THE PREFERRED EMBODIMENTS

First, an OLED display device of the present invention will be described.

Figure 1:
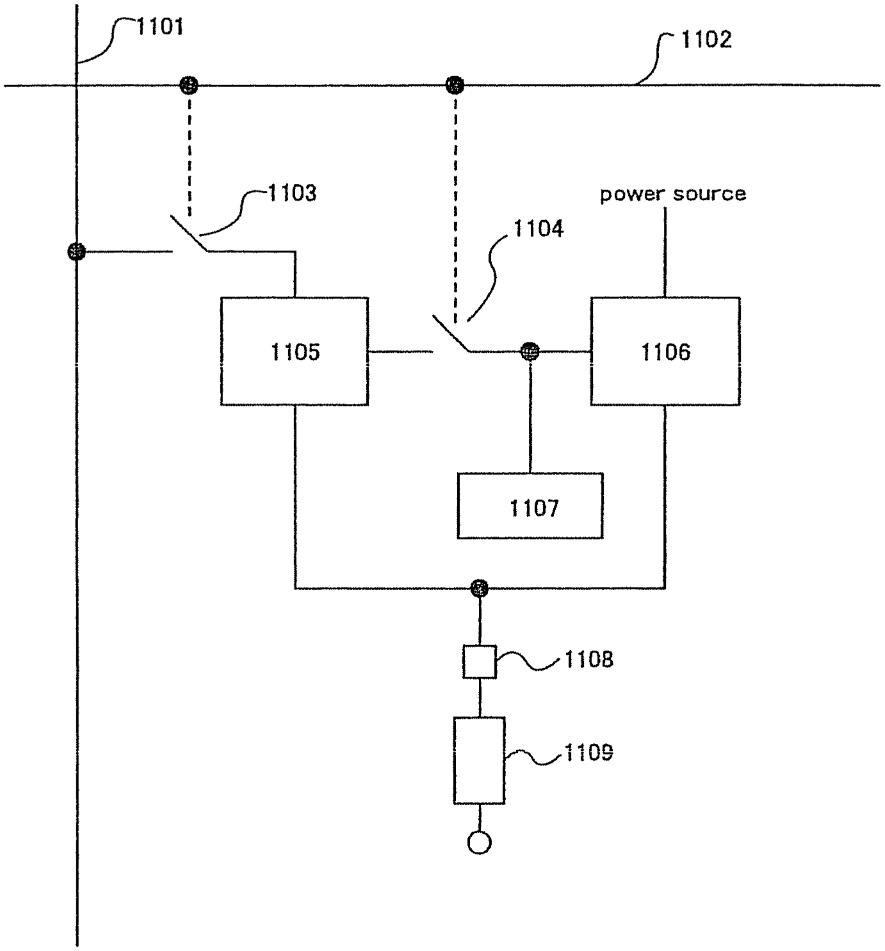
FIG. 1 is a block diagram of a pixel structure of the display device of the present invention.

FIG. 1 shows the structure of the present invention. According to the present invention, there are provided in a pixel region a source signal line 1101, a gate signal line 1102, a first switch 1103 which is controlled by the gate signal line and has one and connected to the source signal line 1101 and the other end connected to a current-voltage conversion element 1105, a second switch 1104 which has one end connected to the current-voltage conversion element 1105 and the other connected to a voltage holding means 1107 and to a voltage-current conversion element 1106, a pixel electrode 1108 connected to the current-voltage conversion element 1105 and to the voltage-current conversion element 1106, and a light emitting element (OLED element) 1109 which uses the pixel electrode 1108 as an anode or cathode thereof.

The above-described structure is specifically explained below. In the case writing a signal to a pixel, a predetermined current is input from the source signal line 1101. When the pixel is selected, the switch 1103 and the switch 1104 are turned on. Thus, the current flows to the current-voltage conversion element 1105 and to the OLED element 1109 through the pixel electrode 1108. At the same time, an output voltage of the current-voltage conversion element 1105 is input to the holding means 1107 and the voltage-current conversion element 1106 through the switch 1104. The voltage-current conversion element 1106 is operated by the voltage, and the current flows from a power source to the pixel electrode 1108. Next, when the writing is completed, the switch 1103 and the switch 1104 are turned off and the inflow of the current from the signal line 1101 stops. The current-voltage conversion element 1105 is turned off. However, the holding means 1107 holds the voltage, and thus, the voltage-current conversion element 1106 is in an on state all the time. Therefore, while the voltage-current conversion element 1106 is turned on, the current continues to flow from the power source to the OLED element 1109 through the pixel electrode 1108 and light is turned on. This operation is continued until the next writing begins.

The current that flows to the OLED element 1109 is controlled by the value input from the source signal line here. The current that flows to the current-voltage conversion element 1105 and the current that flows to the voltage-current conversion element 1106 can be set to have a proportional relationship. When the two elements have the same characteristics, the current that flows to the OLED element can be kept at substantially a constant value even if a different pixel has different element characteristics. For example, even in the case where a gate insulating film has dispersion in a large-scale substrate, the difference in the gate insulating film is small in a point-blank range in a pixel. Thus, it can be said that the difference in one pixel is small. Therefore, the current, which has a small margin of error with respect to the current that flows from the source signal line 1101, can be made to flow to the OLED element 1109. From the above, uniformity, which has been a problem in the prior art, can be improved, and satisfactory uniformity of a screen can be obtained.

The present invention is not limited to the embodiment mode described above, and various modifications are allowed provided that they do not deviate from the spirit of the present invention. For example, in the OLED element, an inorganic compound can be used for a hole injecting layer, a hole transporting layer, an electron injecting layer, an electron transporting layer, and the like except a light emitting layer. A known inorganic compound material can be used as the inorganic compound.

Examples of the inorganic compound material include diamond-like carbon (DLC), Si, Ge, and inorganic compound or nitride of the above materials. P, B, N, or the like may be appropriately added. Further, examples of the inorganic compound material include oxide, nitride, or fluoride of alkali metal or alkaline earth metal, and compound or alloy of the above metal and at least one of Zn, Sn, V, Ru, Sm, and In.

EMBODIMENTS

Embodiments of the present invention will be described below.

Embodiment 1

Figure 2A:
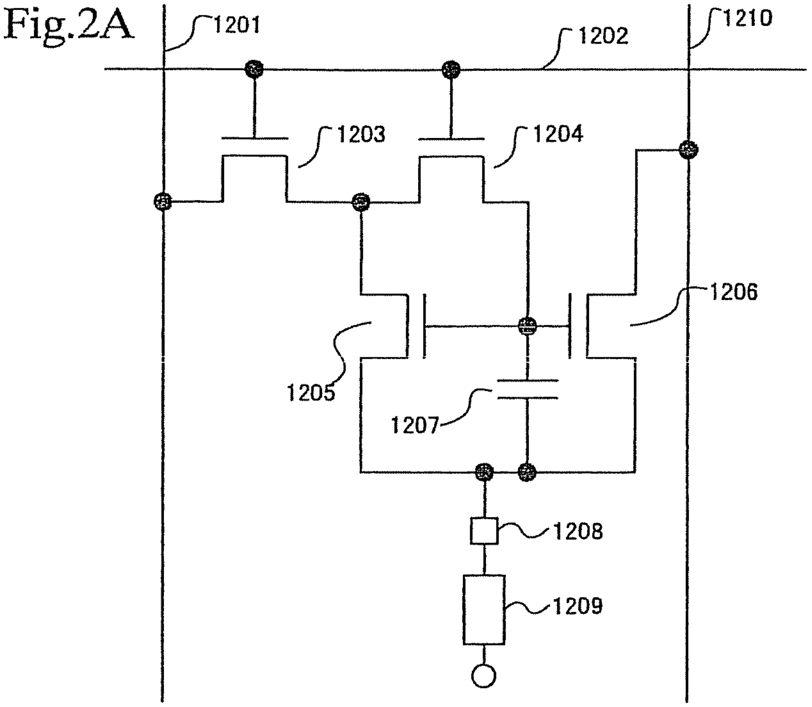
FIGS. 2A and 2B show a circuit diagram of the pixel in the display device of the present invention.

FIG. 2A shows a structure of the present invention, which is structured by thin film transistors. In this example, a current-voltage conversion element, a voltage-current conversion element, and first and second switches are structured from thin film transistors, and a holding means is structured from a capacitor.

In this embodiment, there are provided in a pixel region a source signal line 1201, a gate signal line 1202, a first switch thin film transistor 1203 which is controlled by the gate signal line and has one end connected to the source signal line 1201 and the other end connected to a drain terminal of a thin film transistor 1205, a second switch thin film transistor 1204 which has one end connected to the drain terminal of the thin film transistor 1205 and the other end connected to a gate terminal of the thin film transistor 1205, to a voltage holding capacitor 1207, and to a gate terminal of a thin film transistor 1206, a pixel electrode 1208 connected to a source electrode of the thin film transistor 1205 and to a source electrode of the thin film transistor 1206, and a light emitting element (OLED element) 1209 which uses the pixel electrode 1208 as an anode or cathode thereof.

The above-described structure is specifically explained below. In the case of writing a signal to a pixel, a predetermined current is input from the source signal line 1201. When the pixel is selected, the first switch thin film transistor 1203 and the second switch thin film transistor 1204 are turned on. Thus, the current flows to the thin film transistor 1205 and to the OLED element 1209 through the pixel electrode 1208. At the same time, a gate voltage of the thin film transistor 1205 is input to the holding capacitor 1207 and to the gate terminal of the thin film transistor 1206 through the switch thin film transistor 1204. The thin film transistor 1206 is operated by the voltage, and the current flows from a power source 1210 to the pixel electrode 1208. Next, when the writing is completed, the switch thin film transistor 1203 and the switch thin film transistor 1204 are turned off, and the inflow of the current from the signal line 1201 stops. The thin film transistor 1205 is turned off. However, the holding capacitor 1207 holds the voltage, and thus, the thin film transistor 1206 is kept in an on state. Therefore, while the thin film transistor 1206 is turned on, the current continues to flow from the power source to the OLED element 1209 through the pixel electrode 1208 and light is turned on. This operation is continued until the next writing begins.

The current that flows to the OLED element 1209 is controlled by the value input from the source signal line here. The current that flows to the thin film transistor 1205 and the current that flows to the thin film transistor 1206 can be set to have a proportional relationship. When the respective gate widths are set to have an arbitrary ratio, whereby a current ratio can be set. When the two transistors have the same element characteristics, the current that flows to the OLED element can be kept at substantially a constant value even if a different pixel has different element characteristics. For example, even in the case where a gate insulating film has dispersion in a large-scale substrate, the difference in the gate insulating film is small in a point-blank range in a pixel. Thus, it can be said that the difference in one pixel is small. Therefore, the current, which has a small margin of error with respect to the current that flows from the source signal line 1201, can be made to flow to the OLED element 1209. From the above, uniformity, which has been a problem in the prior art, can be improved, and satisfactory uniformity of a screen can be obtained.

It is also possible that the transistors with the same polarity are used as the thin film transistors described above. When a driver with the single polarity is used in addition to the pixel portion, as disclosed in Japanese Patent Application No. 2001-216029, for example, a display device can be structured with the same polarity. As a result, the number of manufacturing steps is reduced to enable lowering of costs.

The present invention is particularly effective in the case of using a process which especially uses n-type (n-channel) thin film transistors as a single polarity. The n-type (n-channel) has higher mobility than p-type (p-channel), and thus is advantageous in forming a circuit. On the other hand, in the case of forming the OLED element, it is easier to manufacture a display device in the case where the pixel electrode connected to the thin film transistor is an anode than in the case where the pixel electrode is a cathode. In the case where the pixel electrode is the anode, it is necessary that the current flows from the thin film transistor. In a current-input type display device disclosed in JP 2001-147659 A, a thin film transistor that drives a pixel electrode is of p-type. In the case where the display device disclosed in JP 2001-147659 A is used for structuring a display device with a single polarity, p-type has to be used also for a driver circuit and is disadvantageous for operation. Further, in a current-input type display device disclosed in JP 11-282419 A, although a thin film transistor is of n-type, an OLED element is connected to a drain. Thus, a pixel electrode has to be used as a cathode, and it is difficult to form the OLED element. In the present invention, an n-type thin film transistor is used, and a pixel electrode can be used as an anode. Therefore, in the case of structuring a panel with a single polarity, there is an advantage that driver operation and easiness of forming an OLED element are simultaneously satisfied.

Embodiment 2

Figure 2B:
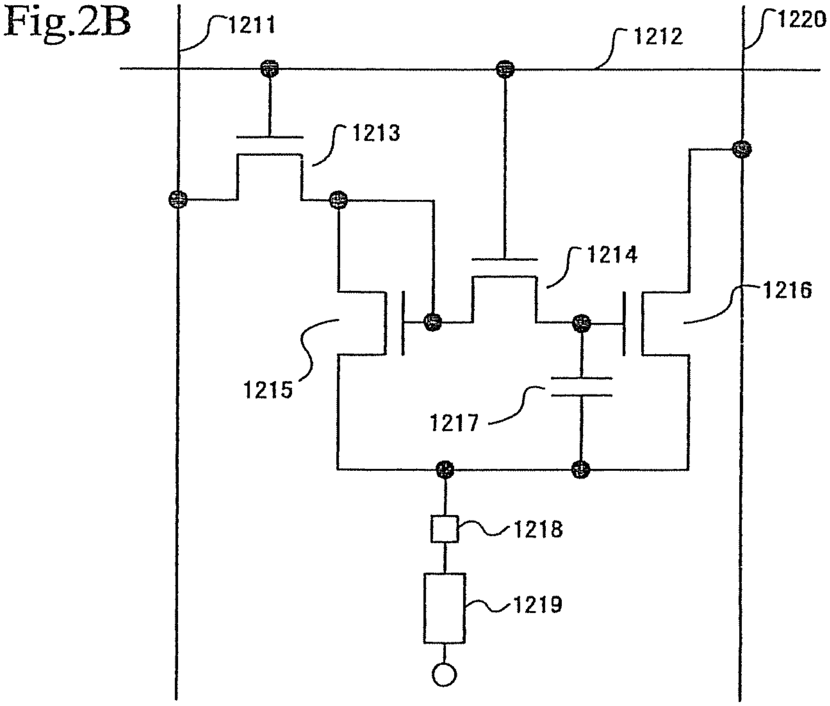

FIG. 2B shows the structure in which the connection of the switches in Embodiment 1 is changed.

In this embodiment, there are provided in a pixel region a source signal line 1211, a gate signal line 1212, a first switch thin film transistor 1213 which is controlled by the gate signal line and has one end connected to the source signal line 1211 and the other end connected to a drain terminal and a gate terminal of a thin film transistor 1215, a second switch thin film transistor 1214 which has one end connected to the drain terminal and the gate terminal of the thin film transistor 1215 and the other end connected to a voltage holding capacitor 1217 and to a gate terminal of a thin film transistor 1216, a pixel electrode 1218 connected to a source electrode of the thin film transistor 1215 and to a source electrode of the thin film transistor 1216, and a light emitting element (OLED element) 1219 which uses the pixel electrode 1218 as an anode or cathode thereof.

The above-described structure is specifically explained below. In the case writing a signal to a pixel, a predetermined current is input from the source signal line 1211. When the pixel is selected, the switch thin film transistor 1213 and the switch thin film transistor 1214 are turned on. Thus, the current flows to the thin film transistor 1215 and to the OLED element 1219 through the pixel electrode 1218. At the same time, a gate voltage of the thin film transistor 1215 is input to the holding capacitor 1217 and to the gate terminal of the thin film transistor 1216 through the switch thin film transistor 1214. The thin film transistor 1216 is operated by the voltage, and the current flows from a power source 1220 to the pixel electrode 1218. Next, when the writing is completed, the switch thin film transistor 1213 and the switch thin film transistor 1214 are turned off, and the inflow of the current from the signal line 1211 stops. The thin film transistor 1215 is turned off. However, the holding capacitor 1217 holds the voltage, and thus, the thin film transistor 1216 is kept in an on state. Therefore, while the thin film transistor 1216 is turned on, the current continues to flow from the power source to the OLED element 1219 through the pixel electrode 1218, and light is turned on. This operation is continued until the next writing begins.

It is also possible that the transistors with the same polarity are used as the thin film transistors described above. When a driver with the single polarity is used in addition to the pixel portion, as disclosed in Japanese Patent Application No. 2001-216029, for example, a display device can be structured with the same polarity. As a result, the number of manufacturing steps is reduced to enable lowering of costs.

The same effect as in Embodiment 1 can be obtained.

Embodiment 3

Figure 3:
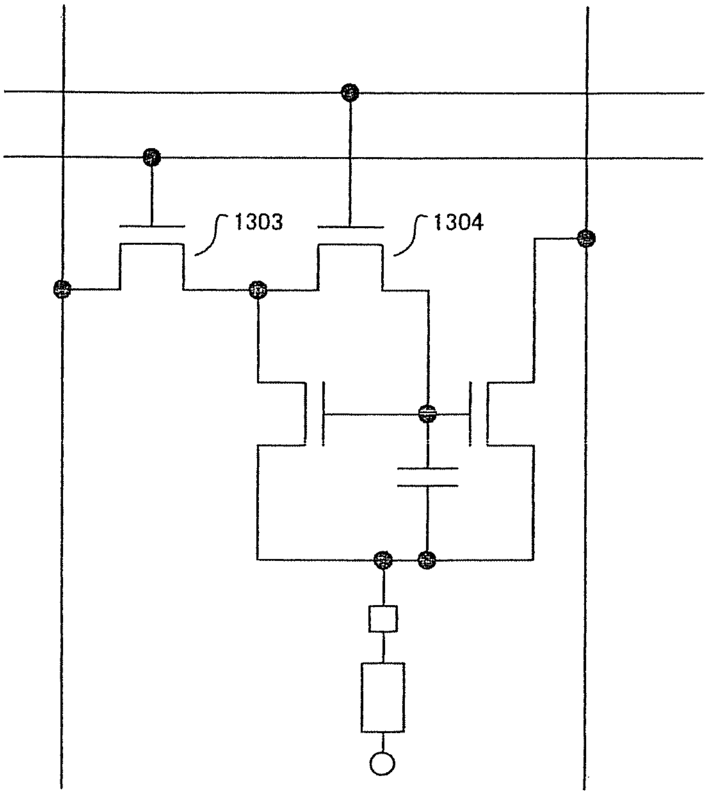
FIG. 3 shows a circuit diagram of the pixel in the display device of the present invention.

FIG. 3 shows a structure in which a switch thin film transistor 1303 and a switch thin film transistor 1304 are controlled by different gate signal lines. The two gate signal lines are used, whereby timing of on and off is staggered between the switches. Thus, it becomes possible to further improve controllability.

The principle of operation is the same as in Embodiment 1, and it is possible to adopt the switch connection as shown in Embodiment 2. Further, the transistors with a single polarity can be used as the thin film transistors.

Embodiment 4

Figure 4:
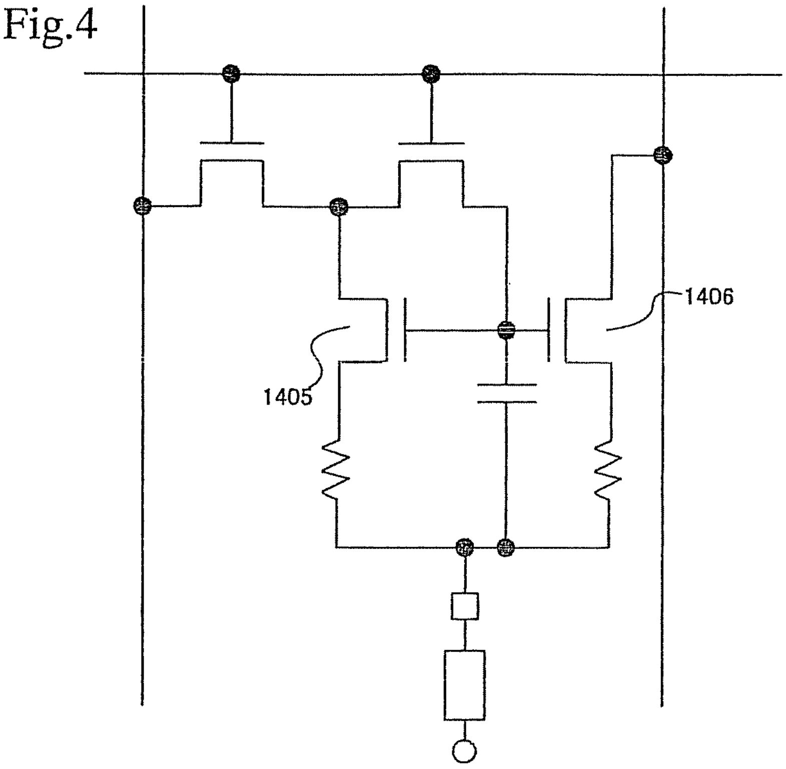
FIG. 4 shows a circuit diagram of the pixel in the display device of the present invention.
Figure 5:
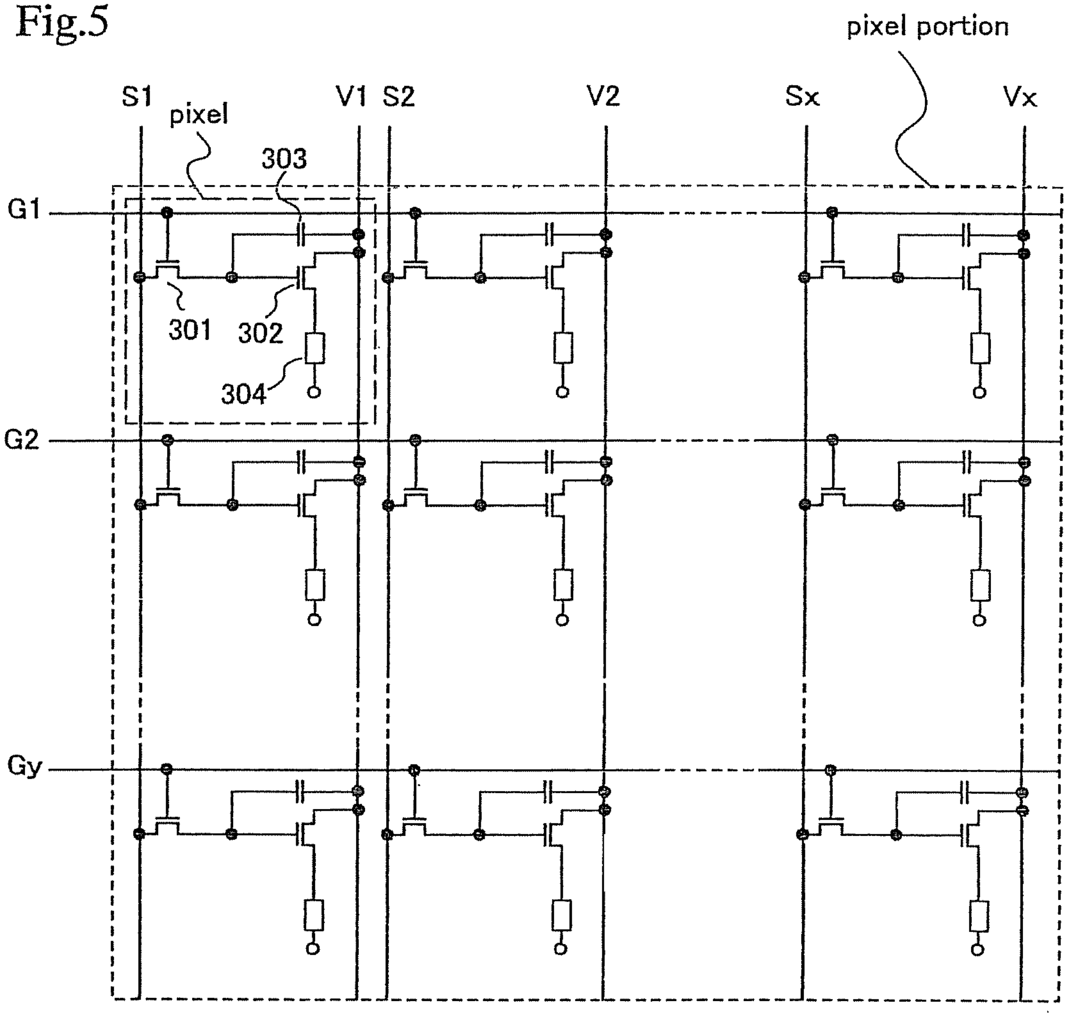
FIG. 5 shows a circuit diagram of the pixel in the conventional display device.
Figure 6:
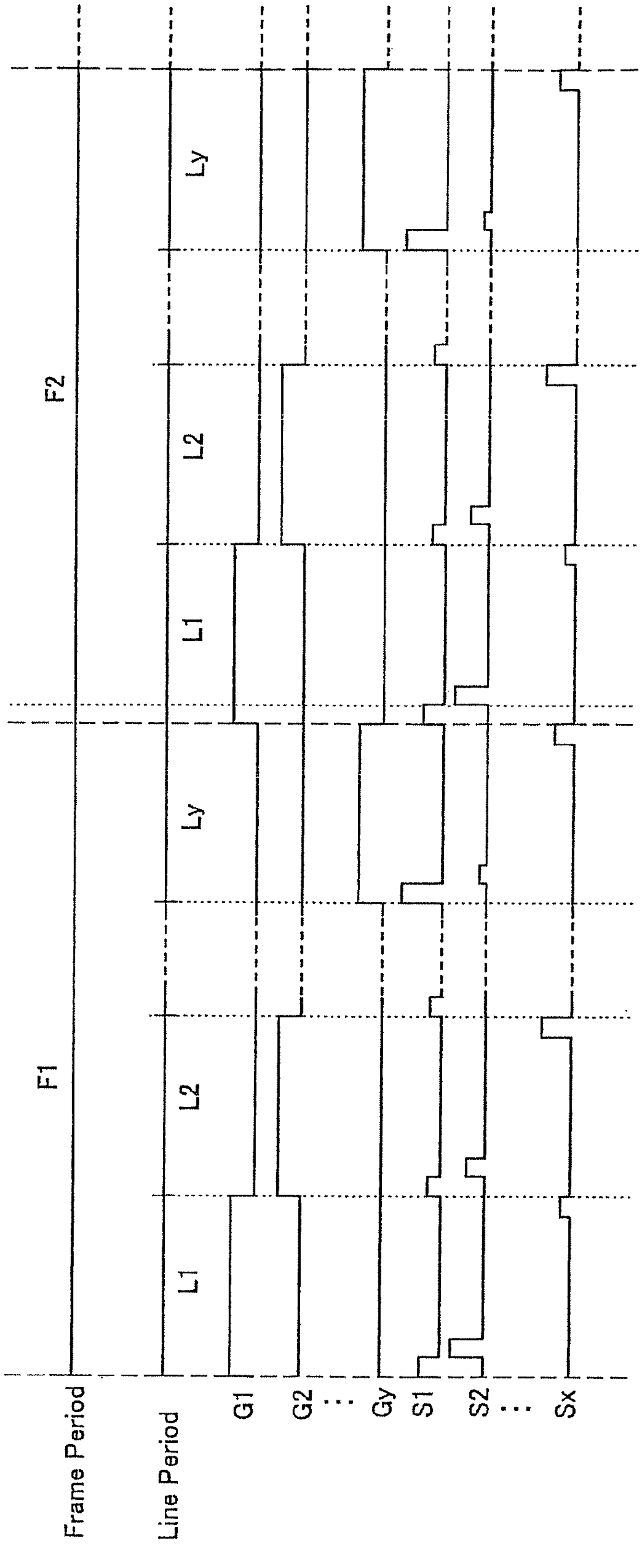
FIG. 6 is a timing chart of a driving method of the pixel in the conventional display devise.
Figure 7:
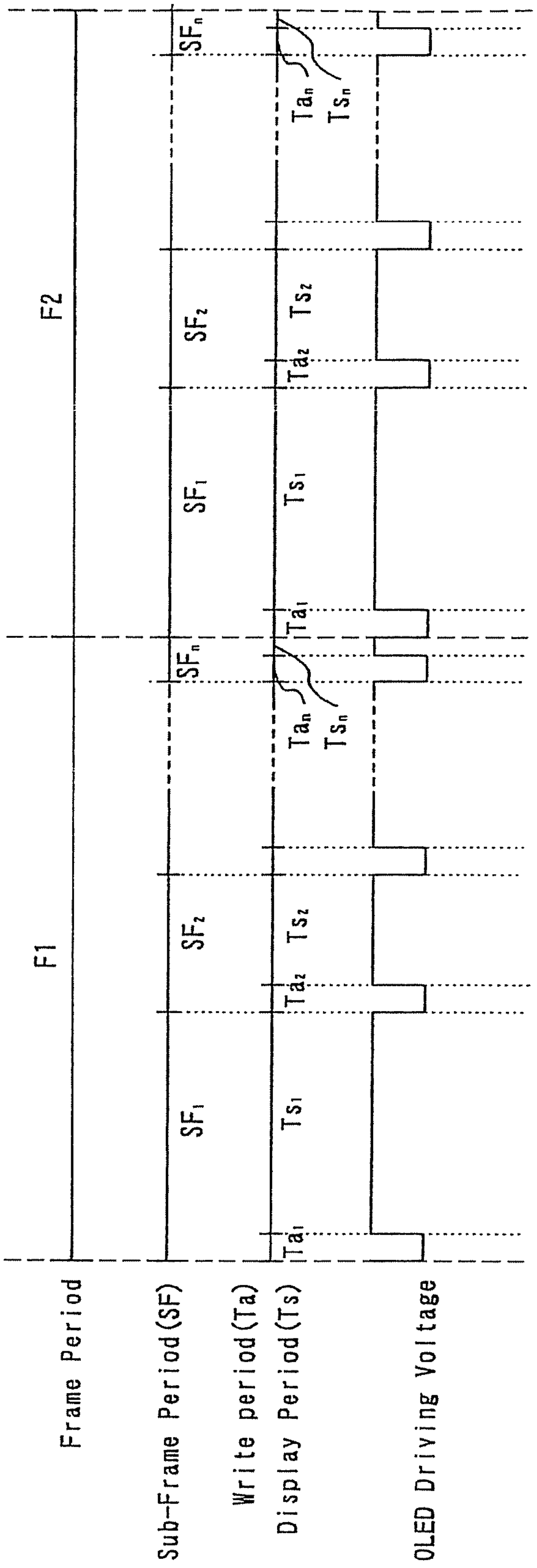
FIG. 7 is a timing chart of a driving method of the pixel in the conventional display devise.

FIG. 4 shows a structure in which resistors are provided between a source electrode of a thin film transistor 1405 and a pixel electrode and between a source electrode of a thin film transistor 1406 and the pixel electrode, respectively. The resistors are connected as described above, whereby the current ratio between the thin film transistors 1405 and 1406 can further be improved. It is possible to combine the method in Embodiment 4 with any of the switch connection method shown in Embodiment 2 and the method of Embodiment 3 in which switches are controlled by two gate signal lines. Further, transistors with a single polarity can be used as the thin film transistors.

Embodiment 5

In Embodiment 5, a method of simultaneously manufacturing TFTs of a pixel portion of an OLED display device of the present invention and driver circuit portions provided in the periphery thereof (a source signal line driver circuit and a gate signal line driver circuit). However, in order to simplify the explanation, a CMOS circuit, which is the basic circuit for the driver circuit, is shown in the figures.

Figure 8A:
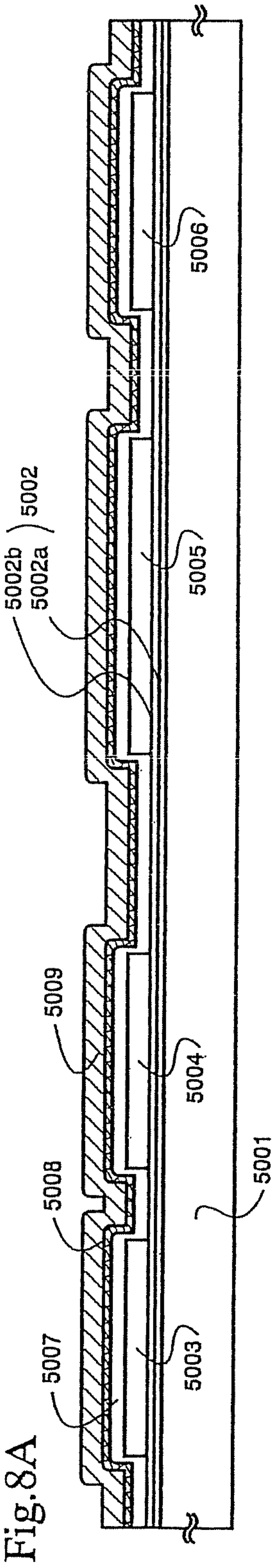
FIGS. 8A-8C show manufacturing steps of the display device of the present invention.

First, as shown in FIG. 8A, a base film 5002 made of an insulating film such as a silicon oxide film, a silicon nitride film, or a silicon oxynitride film is formed on a substrate 5001 made of glass such as barium borosilicate glass or alumino borosilicate glass, typified by #7059 glass or #1737 glass of Corning Inc. For example, a silicon oxynitride film 5002*a* fabricated from $SiH_4$, $NH_3$ and $N_2O$ by a plasma CVD method is formed with a thickness of 10 to 200 nm (preferably 50 to 100 nm), and a hydrogenated silicon oxynitride film 5002*b* similarly fabricated from $SiH_4$ and $N_2O$ is formed with a thickness of 50 to 200 nm (preferably 100 to 150 nm) to form a lamination. In Embodiment 5, although the base film 5002 is shown as the two-layer structure, the film may be formed of a single layer film of the foregoing insulating film or as a lamination structure of more than two layers.

Island-like semiconductor films 5003 to 5006 are formed of a crystalline semiconductor film manufactured by using a laser crystallization method on a semiconductor film having an amorphous structure, or by using a known thermal crystallization method. The thickness of the island-like semiconductor films 5003 to 5006 is set from 25 to 80 nm (preferably between 30 and 60 nm). There is no limitation on the crystalline semiconductor film material, but it is preferable to form the film from a silicon or a silicon germanium (SiGe) alloy.

A laser such as a pulse oscillation type or continuous emission type excimer laser, a YAG laser, or a $YVO_4$ laser is used for manufacturing the crystalline semiconductor film in the laser crystallization method. A method of condensing laser light emitted from a laser oscillator into a linear shape by an optical system and then irradiating the light to the semiconductor film may be employed when these types of lasers are used. The crystallization conditions may be suitably selected by the operator, but the pulse oscillation frequency is set to 30 Hz, and the laser energy density is set from 100 to 400 mJ/cm$^2$ (typically between 200 and 300 mJ/cm$^2$) when using the excimer laser. Further, the second harmonic is utilized when using the YAG laser, the pulse oscillation frequency is set from 1 to 10 kHz, and the laser energy density may be set from 300 to 600 mJ/cm$^2$ (typically between 350 and 500 mJ/cm$^2$). The laser light which has been condensed into a linear shape with a width of 100 to 1000 μm, for example 400 μm, is then irradiated over the entire surface of the substrate. This is performed with an overlap ratio of 80 to 98% in case of the linear laser.

Next, a gate insulating film 5007 is formed covering the island-like semiconductor layers 5003 to 5006. The gate insulating film 5007 is formed of an insulating film containing silicon with a thickness of 40 to 150 nm by a plasma CVD method or a sputtering method. A 120 nm thick silicon oxynitride film is formed in Embodiment 5. The gate insulating film 5007 is not limited to such a silicon oxynitride film, of course, and other insulating films containing silicon may also be used, in a single layer or in a lamination structure. For example, when using a silicon oxide film, it can be formed by the plasma CVD method with a mixture of TEOS (tetraethyl orthosilicate) and $O_2$, at a reaction pressure of 40 Pa, with the substrate temperature set from 300 to 400° C., and by discharging at a high frequency (13.56 MHz) with electric power density of 0.5 to 0.8 W/cm$^2$. Good characteristics of the silicon oxide film thus manufactured as a gate insulating film can be obtained by subsequently performing thermal annealing at 400 to 500° C.

A first conductive film 5008 and a second conductive film 5009 are then formed on the gate insulating film 5007 in order to form gate electrodes. In Embodiment 5, the first conductive film 5008 is formed from Ta with a thickness of 50 to 100 nm, and the second conductive film 5009 is formed from W with a thickness of 100 to 300 nm.

The Ta film is formed by sputtering, and sputtering of a Ta target is performed by using Ar. If an appropriate amount of Xe or Kr is added to the Ar during sputtering, the internal stress of the Ta film will be relaxed, and film peeling can be prevented. The resistivity of an a phase Ta film is on the order of 20 μΩcm, and the Ta film can be used for the gate electrode, but the resistivity of a β phase Ta film is on the order of 180

μΩcm and the Ta film is unsuitable for the gate electrode. The α phase Ta film can easily be obtained if a tantalum nitride film, which possesses a crystal structure near that of phase Ta, is formed with a thickness of 10 to 50 nm as a base for Ta in order to form the phase Ta film.

The W film is formed by sputtering with W as a target. The W film can also be formed by a thermal CVD method using tungsten hexafluoride ($WF_6$). Whichever is used, it is necessary to make the film low resistant in order to use it as the gate electrode, and it is preferable that the resistivity of the W film be set 20 μΩcm or less. The resistivity can be lowered by enlarging the crystals of the W film, but for cases where there are many impurity elements such as oxygen within the W film, crystallization is inhibited, and the film becomes high resistant. A W target having a purity of 99.9999% is thus used in sputtering. In addition, by forming the W film while taking sufficient care such that no impurities from the inside of the gas phase are introduced at the time of film formation, a resistivity of 9 to 20 μΩcm can be achieved.

Note that although the first conductive film 5008 and the second conductive film 5009 are formed from Ta and W, respectively, in Embodiment 5, the conductive films are not limited to these. Both the first conductive film 5008 and the second conductive film 5009 may also be formed from an element selected from the group consisting of Ta, W, Ti, Mo, Al, and Cu, or from an alloy material or a chemical compound material having one of these elements as its main constituent. Further, a semiconductor film, typically a polysilicon film, into which an impurity element such as phosphorus is doped, may also be used. Examples of preferable combinations other than that in Embodiment 5 include: the first conductive film 5008 formed from tantalum nitride (TaN) and the second conductive film 5009 formed from W; the first conductive film 5008 formed from tantalum nitride (TaN) and the second conductive film 5009 formed from Al; and the first conductive film 5008 formed from tantalum nitride (TaN) and the second conductive film 5009 formed from Cu.

Next, a mask 5010 is formed from resist, and a first etching process is performed in order to form electrodes and wirings. An ICP (inductively coupled plasma) etching method is used in Embodiment 5. A gas mixture of $CF_4$ and $Cl_2$ is used as an etching gas, and a plasma is generated by applying a 500 W RF electric power (13.56 MHz) to a coil shape electrode at 1 Pa. A 100 W RF electric power (13.56 MHz) is also applied to the substrate side (test piece stage), effectively applying a negative self-bias voltage. The W film and the Ta film are both etched on the same order when $CF_4$ and $Cl_2$ are mixed.

Figure 8B:
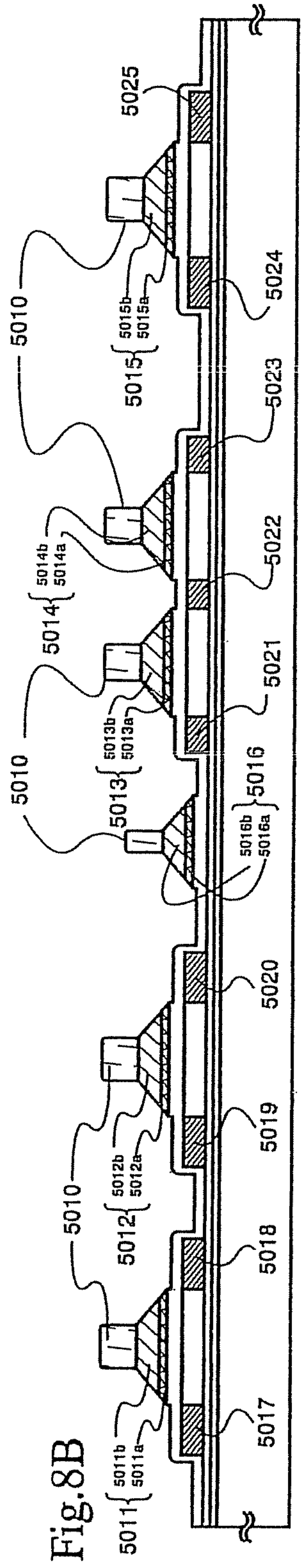

Edge portions of the first conductive layer and the second conductive layer are made into a tapered shape in accordance with the effect of the bias voltage applied to the substrate side with the above etching conditions by using a suitable resist mask shape. The angle of the tapered portions is from 15 to 45°. The etching time may be increased by approximately 10 to 20% in order to perform etching without any residue on the gate insulating film. The selectivity of a silicon oxynitride film with respect to a W film is from 2 to 4 (typically 3), and therefore approximately 20 to 50 nm of the exposed surface of the silicon oxynitride film is etched by this over-etching process. First shape conductive layers 5011 to 5016 (first conductive layers 5011*a* to 5016*a* and second conductive layers 5011*b* to 5016*b*) are thus formed of the first conductive layer and the second conductive layer by the first etching process. At this point, regions of the gate insulating film 5007 not covered by the first shape conductive layers 5011 to 5016 are made thinner by approximately 20 to 50 nm by etching. (FIG. 8B)

Then, a first doping process is performed to add an impurity element for imparting an n-type conductivity. Doping may be carried out by an ion doping method or an ion implanting method. The condition of the ion doping method is that a dosage is $1\times10^{13}$ to $5\times10^{14}$ atoms/cm$^2$, and an acceleration voltage is 60 to 100 keV. As the impurity element for imparting the n-type conductivity, an element belonging to group 15, typically phosphorus (P) or arsenic (As) is used, but phosphorus is used here. In this case, the conductive layers 5011 to 5015 become masks to the impurity element to impart the n-type conductivity, and first impurity regions 5017 to 5025 are formed in a self-aligning manner. The impurity element to impart the n-type conductivity in the concentration range of $1\times10^{20}$ to $1\times10^{21}$ atoms/cm$^3$ is added to the first impurity regions 5017 to 5025. (FIG. 8B)

Figure 8C:
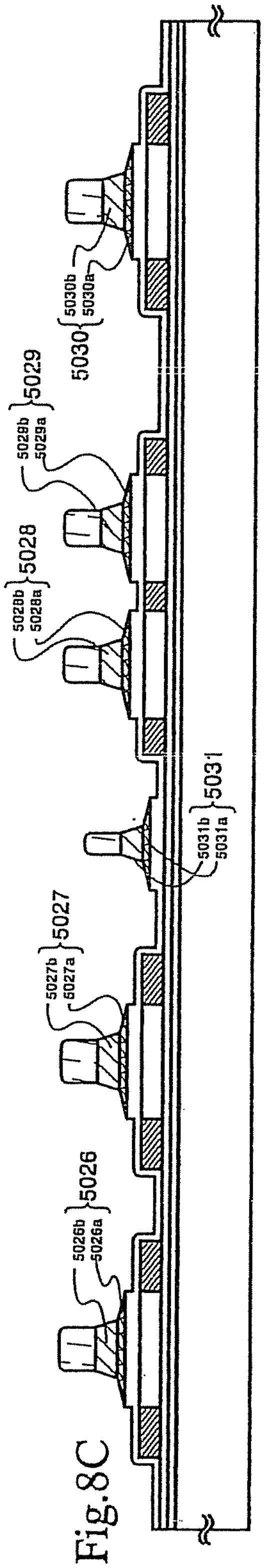

Next, as shown in FIG. 8C, a second etching process is performed without removing the mask formed from resist. The etching gas of the mixture of $CF_4$, $Cl_2$ and $O_2$ is used, and the W film is selectively etched. At this point, second shape conductive layers 5026 to 5031 (first conductive layers 5026*a* to 5031*a* and second conductive layers 5026*b* to 5031*b*) are formed by the second etching process. Regions of the gate insulating film 5007, which are not covered with the second shape conductive layers 5026 to 5031 are made thinner by about 20 to 50 nm by etching.

An etching reaction of the W film or the Ta film by the mixture gas of $CF_4$ and $Cl_2$ can be guessed from a generated radical or ion species and the vapor pressure of a reaction product. When the vapor pressures of fluoride and chloride of W and Ta are compared with each other, the vapor pressure of $WF_6$ of fluoride of W is extremely high, and other $WCl_5$, $TaF_5$, and $TaCl_5$ have almost equal vapor pressures. Thus, in the mixture gas of $CF_4$ and $Cl_2$, both the W film and the Ta film are etched. However, when a suitable amount of $O_2$ is added to this mixture gas, $CF_4$ and $O_2$ react with each other to form CO and F, and a large number of F radicals or F ions are generated. As a result, an etching rate of the W film having the high vapor pressure of fluoride is increased. On the other hand, with respect to Ta, even if F is increased, an increase of the etching rate is relatively small. Besides, since Ta is easily oxidized as compared with W, the surface of Ta is oxidized by addition of $O_2$. Since the oxide of Ta does not react with fluorine or chlorine, the etching rate of the Ta film is further decreased. Accordingly, it becomes possible to make a difference between the etching rates of the W film and the Ta film, and it becomes possible to make the etching rate of the W film higher than that of the Ta film.

Figure 9A:
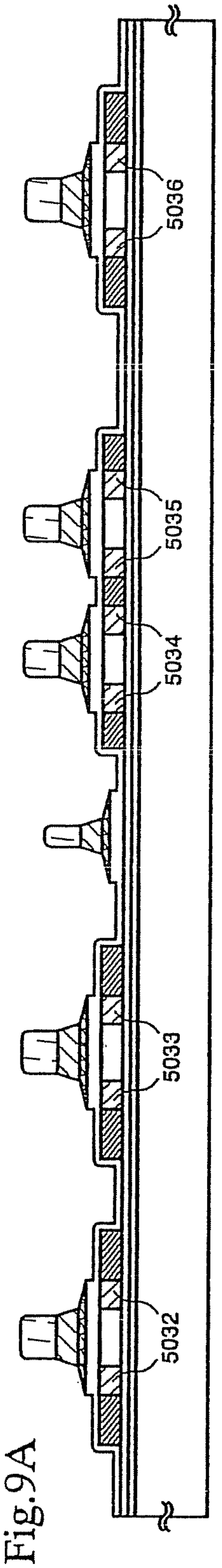
FIGS. 9A-9C show manufacturing steps of the display device of the present invention.

Then, as shown in FIG. 9A, a second doping process is performed. In this case, a dosage is made lower than that of the first doping process and under the condition of a high acceleration voltage, an impurity element for imparting the n-type conductivity is doped. For example, the process is carried out with an acceleration voltage set to 70 to 120 keV and at a dosage of $1\times10^{13}$ atoms/cm$^2$, so that new impurity regions are formed inside of the first impurity regions formed into the island-like semiconductor layers in FIG. 8B. Doping is carried out such that the second shape conductive layers 5026 to 5031 are used as masks to the impurity element and the impurity element is added also to the regions under the first conductive layers 5026*a* to 5031*a*. In this way, third impurity regions 5032 to 5036 are formed. The concentration of phosphorus (P) added to the third impurity regions has a gentle concentration gradient in accordance with the thickness of tapered portions of the first conductive layers 5026*a* to 5031*a*. Note that in the semiconductor layer that overlap with the tapered portions of the first conductive layers 5026*a* to 5031*a*, the concentration of impurity element slightly falls from the end portions of the tapered portions of the first conductive layers 5026*a* to 5031*a* toward the inner portions, but the concentration keeps almost the same level.

Figure 9B:
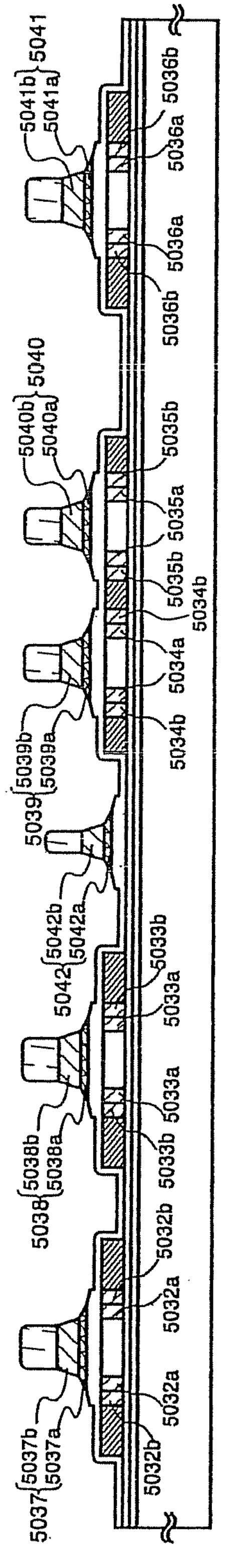

As shown in FIG. 9B, a third etching process is performed. This is performed by using a reactive ion etching method (RIE method) with an etching gas of $CHF_6$. The tapered portions of the first conductive layers 5026*a* to 5031*a* are partially etched, and the region in which the first conductive layers overlap with the semiconductor layer is reduced by the third etching process. Third shape conductive layers 5037 to 5042 (first conductive layers 5037*a* to 5042*a* and second conductive layers 5037*b* to 5042*b*) are formed. At this point, regions of the gate insulating film 5007, which are not covered with the third shape conductive layers 5037 to 5042 are made thinner by about 20 to 50 nm by etching.

By the third etching process, in third impurity regions 5032 to 5036, third impurity regions 5032*a* to 5036*a*, which overlap with the first conductive layers 5037*a* to 5041*a*, and second impurity regions 5032*b* to 5236*b* between the first impurity regions and the third impurity regions are formed.

Figure 9C:
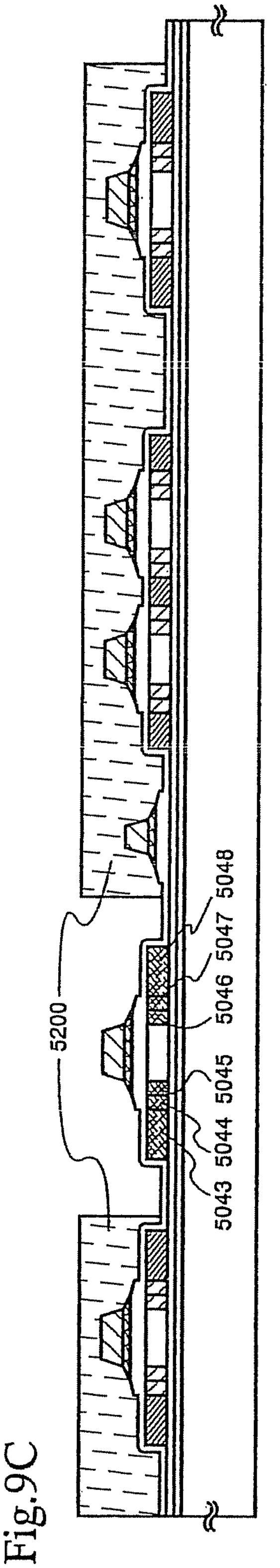

Then, as shown in FIG. 9C, fourth impurity regions 5043 to 5048 having a conductivity type opposite to the first conductivity type are formed in the island-like semiconductor layer 5004 for forming P-channel TFTs. The second conductive layer 5038*b* is used as masks to an impurity element, and the impurity regions are formed in a self-aligning manner. At this time, the whole surfaces of the island-like semiconductor layers 5003, 5005 and 5006 and the wiring portion 5042, which form N-channel TFTs are covered with a resist mask 5200. Phosphorus is added to the impurity regions 5043 to 5048 at different concentrations, respectively. The regions are formed by an ion doping method using diborane ($B_2H_6$) and the impurity concentration is made $2\times10^{20}$ to $2\times10^{21}$ atoms/$cm^3$ in any of the regions.

By the steps up to this, the impurity regions are formed in the respective island-like semiconductor layers. The third shape conductive layers 5037 to 5041 overlapping with the island-like semiconductor layers function as gate electrodes. The conductive layer 5042 functions as an island-like source signal line.

After the resist mask 5200 is removed, a step of activating the impurity elements added in the respective island-like semiconductor layers for the purpose of controlling the conductivity type. This step is carried out by a thermal annealing method using a furnace annealing oven. In addition, a laser annealing method or a rapid thermal annealing method (RTA method) can be applied. The thermal annealing method is performed in a nitrogen atmosphere having an oxygen concentration of 1 ppm or less, preferably 0.1 ppm or less and at 400 to 700° C., typically 500 to 600° C. In Embodiment 5, a heat treatment is conducted at 500° C. for 4 hours. However, in the case where a wiring material used for the third conductive layers 5037 to 5042 is weak to heat, it is preferable that the activation is performed after an interlayer insulating film (containing silicon as its main ingredient) is formed to protect the wiring line or the like.

Further, a heat treatment at 300 to 450° C. for 1 to 12 hours is conducted in an atmosphere containing hydrogen of 3 to 100%, and a step of hydrogenating the island-like semiconductor layers is conducted. This step is a step of terminating dangling bonds in the semiconductor layer by thermally excited hydrogen. As another means for hydrogenation, plasma hydrogenation (using hydrogen excited by plasma) may be carried out.

Figure 10A:
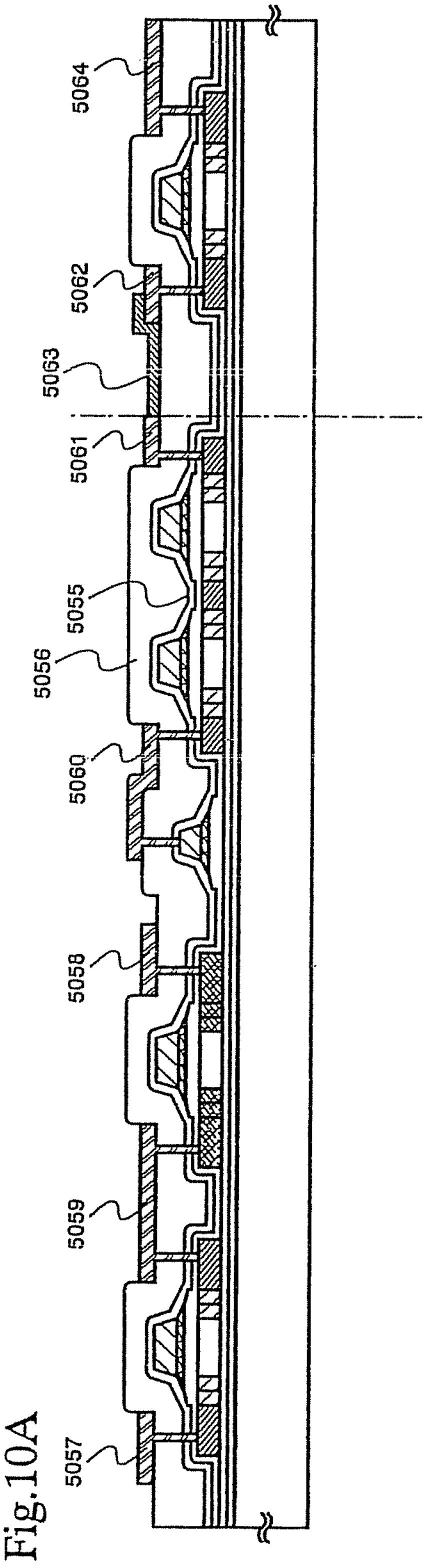
FIGS. 10A-10B show manufacturing steps of the display device of the present invention.

Next, as shown in FIG. 10A, a first interlayer insulating film 5055 having a thickness of 100 to 200 nm is formed of a silicon oxynitride film. A second interlayer insulating film 5056 made of an organic insulator material is formed thereon. Contact holes are then formed with respect to the first interlayer insulating film 5055, the second interlayer insulating film 5056, and the gate insulating film 5007, respective wirings (including connection wirings and signal lines) 5057 to 5062, and 5064 are formed by patterning, and then, a pixel electrode 5063 that contacts with the connection wiring 5062 is formed by patterning.

Next, the film made from organic resin is used for the second interlayer insulating film 5056. As the organic resin, polyimide, polyamide, acryl, BCB (benzocyclobutene) or the like can be used. Especially, since the second interlayer insulating film 5056 has rather the meaning of flattening, acryl is desirable in flatness. In Embodiment 5, an acryl film is formed to such a thickness that stepped portions formed by the TFTs can be adequately flattened. The thickness is preferably made 1 to 5 μm (more preferably 2 to 4 μm).

In the formation of the contact holes, dry etching or wet etching is used, and contact holes reaching the n-type impurity regions 5017, 5018, 5021 and 5023 to 5025 or the p-type impurity regions 5043 to 5048, a contact hole reaching the wiring 5042, a contact hole reaching the power source supply line (not shown), and contact holes reaching the gate electrodes (not shown) are formed, respectively.

Further, a lamination film of a three layer structure, in which a 100 nm thick Ti film, a 300 nm thick aluminum film containing Ti, and a 150 nm thick Ti film are formed in succession by sputtering, is patterned into a desirable shape, and the resultant lamination film is used as the wirings (including connection wirings and signal lines) 5057 to 5062, and 5064. Of course, other conductive films may be used.

Furthermore, in Embodiment 5, a MgAg film is formed with a thickness of 110 nm, and patterning is performed to form the pixel electrode 5063. The pixel electrode 5063 is arranged so as to contact and overlap the connection wiring 5062 so that contact is obtained. This pixel electrode 5063 corresponds to a cathode of an OLED element. (FIG. 10A)

Figure 10B:
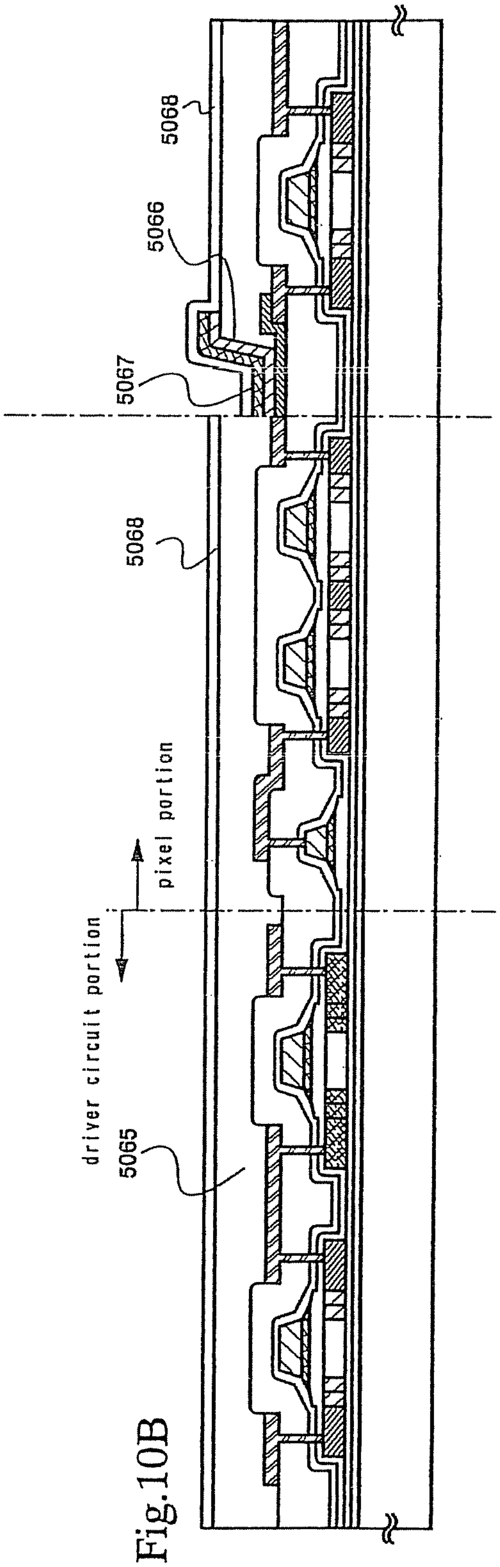

Next, as shown in FIG. 10B, an insulating film containing silicon (a silicon oxide film in Embodiment 5) is formed with a thickness of 500 nm, an opening portion is formed at the position corresponding to the pixel electrode 5063, and then, a third interlayer insulating film 5065 that functions as a bank is formed. In forming the opening portion, side walls having a tapered shape may be easily formed by using wet etching. The deterioration of the OLED layer due to stepped portion becomes a remarkable problem if the side walls of the opening portion are sufficiently flat.

An OLED layer 5066 and an anode (transparent electrode) 5067 are formed next in succession, without exposure to the atmosphere, using a vacuum evaporation method. Note that the film thickness of the OLED layer 5066 may be set from 80 to 200 nm (typically between 100 and 120 nm), and the thickness of the cathode 5067 is formed from ITO film.

The OLED layer and the cathode are formed one after another with respect to pixels corresponding to the color red, pixels corresponding to the color green, and pixels corresponding to the color blue. However, the OLED layer is weak with respect to a solution, and therefore the OLED layer and the cathode must be formed with respect to each of the colors without using a photolithography technique. It is preferable to cover areas outside of the desired pixels using a metal mask, and selectively form the OLED layer and the cathode only in the necessary locations.

In other words, a mask is first set so as to cover all pixels except for those corresponding to the color red, and the OLED layer for emitting red color light is selectively formed using the mask. Next, a mask is set so as to cover all pixels except for those corresponding to the color green, and the OLED layer for emitting green color light is selectively formed using the mask. Similarly, a mask is set so as to cover all pixels except for those corresponding to the color blue, and the OLED layer for emitting blue color light is selectively formed using the mask. Note that the use of all different masks is stated here, but the same mask may also be reused.

The method of forming three kinds of OLED elements corresponding to the colors RGB is used here, but a method of combining a white color light emitting OLED element and a color filter, a method of combining a blue or blue-green color light emitting OLED element and a fluorescing body (fluorescing color conversion layer: CCM), a method of using a transparent electrode as a cathode (opposing electrode) and overlapping it with OLED elements each corresponding to one of the colors RGB and the like may be used.

A known material can be used as the OLED layer 5066. Considering the driver voltage, it is preferable to use an organic material as the known material. For example, a four layer structure constituted of a hole injecting layer, a hole transporting layer, a light emitting layer and an electron injecting layer may be adopted as an OLED layer.

Next, the anode 5067 is formed using a metal mask on the pixels having the switching TFTs of which the gate electrodes are connected to the same gate signal line (pixels on the same line).

Note that, in Embodiment 5, although MgAg is used as the anode 5067, the present invention is not limited to this. Other known materials may be used for the anode 5067 and the cathode 5063.

Finally, a passivation film 5068 made of a silicon nitride film is formed with a thickness of 300 nm. The formation of the passivation film 5068 enables the OLED layer 5066 to be protected against moisture and the like, and the reliability of the OLED element can further be enhanced.

Consequently, the EL display device with the structure as shown in FIG. 10B is completed. Note that, in the manufacturing process of the OLED display device in Embodiment 5, the source signal lines are formed from Ta and W, which are materials for forming gate electrodes, and the gate signal lines are formed from Al, which is a material for forming wirings, but different materials may be used.

TFT in the active matrix type OLED display device formed by the aforementioned steps has a top gate structure, but this embodiment can be easily applied to bottom gate structure TFT and other structure TFT.

Further, the glass substrate is used in this embodiment, but it is not limited. Other than glass substrate, such as the plastic substrate, the stainless substrate and the single crystalline wafers can be used to implement.

Incidentally, the OLED display device in Embodiment 5 exhibits the very high reliability and has the improved operational characteristic by providing TFTs having the most suitable structure in not only the pixel portion but also the driver circuit portion. Further, it is also possible to add a metallic catalyst such as Ni in the crystallization process, thereby increasing crystallinity. It therefore becomes possible to set the driving frequency of the source signal line driver circuit to 10 MHz or higher.

First, a TFT having a structure in which hot carrier injection is reduced without decreasing the operating speed as much as possible is used as an N-channel TFT of a CMOS circuit forming the driver circuit portion.

In Embodiment 5, the active layer of the N-channel TFT contains the source region, the drain region, the LDD (lightly doped drain) region overlapping with the gate electrode with the gate insulating film sandwiched therebetween (Lov region), the LDD region not overlapping with the gate electrode with the gate insulating film sandwiched therebetween (Loff region), and the channel forming region.

Further, there is not much need to worry about degradation due to the hot carrier injection with the P-channel TFT of the CMOS circuit, and therefore LDD regions may not be formed in particular. It is of course possible to form LDD regions similar to those of the N-channel TFT, as a measure against hot carriers.

In addition, when using a CMOS circuit in which electric current flows in both directions in the channel forming region, namely a CMOS circuit in which the roles of the source region and the drain region interchange, it is preferable that LDD regions be formed on both sides of the channel forming region of the N-channel TFT forming the CMOS circuit, sandwiching the channel forming region. Further, when a CMOS circuit in which it is necessary to suppress the value of the off current as much as possible is used, the n-channel TFT forming the CMOS circuit preferably has an Lov region.

Note that, in practice, it is preferable to perform packaging (sealing), without exposure to the atmosphere, using a protecting film (such as a laminated film or an ultraviolet cured resin film) having good airtight properties and little out gassing, or a transparent sealing material, after completing through the state of FIG. 10B. At this time, the reliability of the OLED element is increased by making an inert atmosphere on the inside of the sealing material and by arranging a drying agent (barium oxide, for example) inside the sealing material.

Further, after the airtight properties have been increased by the packaging process, a connector (flexible printed circuit: FPC) is attached in order to connect terminals led from the elements or circuits formed on the substrate with external signal terminals. Then, a finished product is completed.

Furthermore, in accordance with the process shown in Embodiment 5, the number of photo masks required for manufacture of an OLED device can be suppressed. As a result, the process can be shortened, and the reduction of the manufacturing cost and the improvement of the yield can be attained.

The aforementioned manufacturing step can be applied to the manufacturing step of the display device using TFTs with a single polarity that is structured by only N-type TFT if the manufacturing step of p-type TFT is removed.

The manufacturing step is not limited to aforementioned. The structure of TFT constituting the display device is not limited to a top gate type TFT, for example, bottom gate type TFT or a dual gate type TFT can also be used.

Embodiment 6

In this embodiment, an example of fabricating an OLED display device of the present invention will be described with reference to FIGS. 11A to 11C.

Figure 11A:
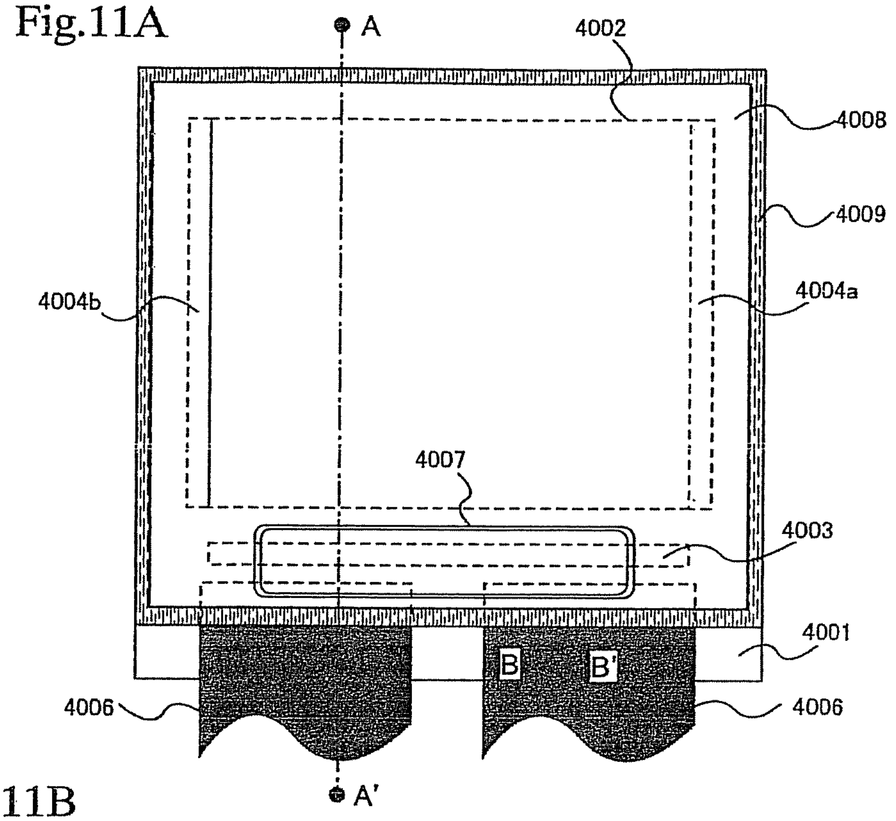
FIGS. 11A-11C show an appearance of the display device and cross-sections views thereof.
Figure 11B:
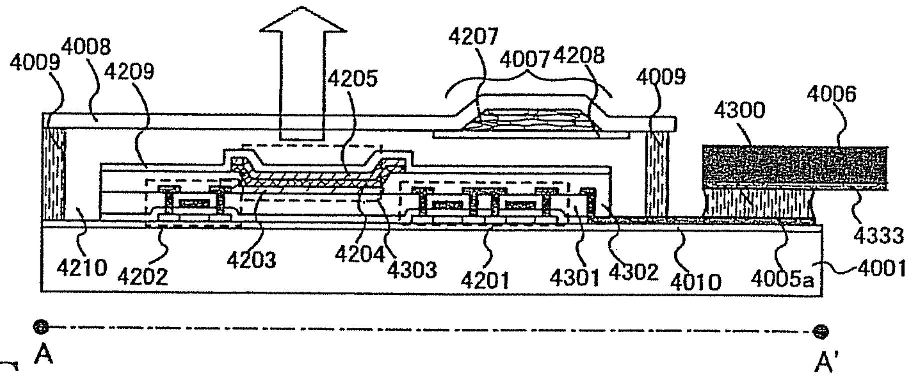
Figure 11C:
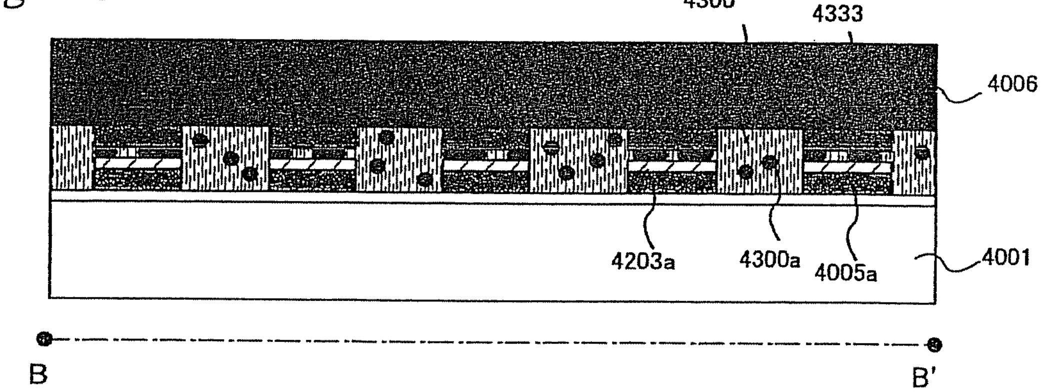

FIG. 11A is a top view of the OLED display device, FIG. 11B is a sectional view taken along a line A-A' of FIG. 11A, and FIG. 11C is a sectional view taken along a line B-B' of FIG. 11A.

A seal member 4009 is provided so as to surround a pixel portion 4002, a source signal line driving circuit 4003, and first and second gate signal line driving circuits **4004*a* and 4004*b*, which are provided on a substrate 4001. Further, a sealing member 4008 is provided over the pixel portion 4002, the source signal line driving circuit 4003, and the first and the second gate signal line driving circuits 4004*a* and 4004*b*. Thus, the pixel portion 4002, the source signal line driving circuit 4003, and the first and the second gate signal line driving circuits 4004***a* and 4004*b* are sealed with a filler 4210 by the substrate 4001, the seal member 4009, and the sealing member 4008.

Further, the pixel portion 4002, the source signal line driving circuit 4003, and the first and the second gate signal line driving circuits 4004*a* and 4004*b* provided on the substrate 4001 include a plurality of TFTs. FIG. 11B typically shows driving TFTs (here, an n-channel TFT and a p-channel TFT are shown) 4201 included in the source signal line driving circuit 4003 and a pixel TFT 4202 (a TFT for inputting drain current to an OLED element) included in the pixel portion 4002, which are formed on an under film 4010.

In this embodiment, the p-channel TFT and the n-channel TFT fabricated by a well-known method are used as the driving TFTs 4201, and a p-channel TFT fabricated by a well known method is used as the pixel TFT 4202.

An interlayer insulating film (flattening film) 4301 is formed on the driving TFTs 4201 and the pixel TFT 4202, and a pixel electrode (anode) 4203 electrically connected to a drain region of the pixel TFT 4202 is formed thereon. A transparent conductive film with a high work function is used as the pixel electrode 4203. A compound of indium oxide and tin oxide, a compound of indium oxide and zinc oxide, zinc oxide, tin oxide, or indium oxide can be used for the transparent conductive film. Further, the transparent conductive film doped with gallium may be used.

An insulating film 4302 is formed on the pixel electrode 4203, and an opening portion is formed in the insulating film 4302 over the pixel electrode 4203. In this opening portion, an OLED layer 4204 is formed on the pixel electrode 4203. A well-known organic material or inorganic material can be used for the OLED layer 4204. Although the organic material includes a low molecular (monomer) and a high molecular (polymer), either may be used.

As a formation method of the OLED layer 4204, a well-known evaporation technique or coating technique may be used. The structure of the OLED layer may be a laminate structure obtained by freely combining any of a hole injecting layer, a hole transporting layer, a light emitting layer, an electron transporting layer, and an electron injecting layer, or a single layer structure.

A cathode 4205 of a conductive film (typically, a conductive film containing aluminum, copper or silver as its main component, or a laminate film the above film and another conductive film) with a light shielding property is formed on the OLED layer 4204. It is desirable that moisture and oxygen existing on the interface between the cathode 4205 and the OLED layer 4204 are removed to the utmost. Accordingly, it is necessary to make such contrivance that the OLED layer 4204 is formed in a nitrogen or rare gas atmosphere, and the cathode 4205 is formed while the OLED layer is not exposed to oxygen or moisture. In this embodiment, a film forming apparatus with a multi-chamber system (cluster tool system) is used, and the film fog nation as described above is enabled. A predetermined voltage is applied to the cathode 4205.

As described above, an OLED element 4303 constituted by the pixel electrode (anode) 4203, the OLED layer 4204, and the cathode 4205 is formed. Then, a protection film 4209 is formed on the insulating film 4302 so as to cover the OLED element 4303. The protection film 4209 is effective to prevent oxygen, moisture and the like from penetrating into the OLED element 4303.

Reference numeral 4005*a* designates a drawing wiring line connected to a power supply line and electrically connected to a source region of the TFT 4202. The drawing wiring line 4005*a* is formed between the seal member 4009 and the substrate 4001, and electrically connected to an FPC wiring line 4333 included in an FPC 4006 through an anisotropic conductive film 4300.

As the sealing member 4008, a glass member, a metal member (typically, a stainless member), a ceramic member, or a plastic member (including a plastic film) can be used. As the plastic member, an FRP (Fiberglass-Reinforced Plastics) plate, a PVF (polyvinyl fluoride) film, a Mylar film, a polyester film or an acryl resin film can be used. Further, a sheet which has such a structure that an aluminum foil is interposed between PVF films or Mylar films can also be used.

However, in the case where the radiation direction of light from the OLED element is directed toward the side of the sealing member, the sealing member must be transparent. In this case, a transparent material such as a glass plate, a plastic plate, a polyester film, or an acryl film is used.

As the filler 4210, in addition to an inert gas such as nitrogen or argon, ultraviolet ray curing resin or thermosetting resin can be used. PVC (polyvinyl chloride), acryl, polyimide, epoxy resin, silicone resin, PVB (polyvinyl butyral), or EVA (ethylene-vinyl acetate) can be used. In this embodiment, nitrogen was used as the filler.

Further, in order to expose the filler 4210 to a hygroscopic material (preferably, barium oxide) or a material which is capable of absorbing oxygen, a recess portion 4007 is provided on the surface of the sealing member 4008 at the side of the substrate 4001, and the hygroscopic material or the material which is capable of absorbing oxygen 4207 is disposed. Then, in order to prevent the hygroscopic material or the material capable of absorbing oxygen 4207 from scattering, the hygroscopic material or the material capable of absorbing oxygen are held in the recess portion 4007 by a recess cover member 4208. Note that, the recess cover member 4208 is formed into a fine mesh, and has such a structure that air and moisture are permeated and the hygroscopic material or the material capable of absorbing oxygen 4207 is not permeated. The deterioration of the OLED element 4303 can be suppressed by providing therewith the hygroscopic material or the material capable of absorbing oxygen 4207.

As shown in FIG. 11C, in forming the pixel electrode 4203, a conductive film 4203*a* is simultaneously formed to be in contact with the drawing wiring line 4005*a*.

The anisotropic conductive film 4300 includes a conductive filler 4300*a*. When the substrate 4001 and the FPC 4006 are thermally compressed, the conductive film 4203*a* over the substrate 4001 and the FPC wiring line 4333 on the FPC 4006 are electrically connected through the conductive filler 4300*a*.

Embodiment 7

FIG. 12 shows a sectional-view illustrating the pixel structure of the OLED display device of the present invention. In this embodiment, a TFT for making a drain current flow to an OLED element is shown alone as one of elements which constitute a pixel of the OLED display device.

Figure 12A:
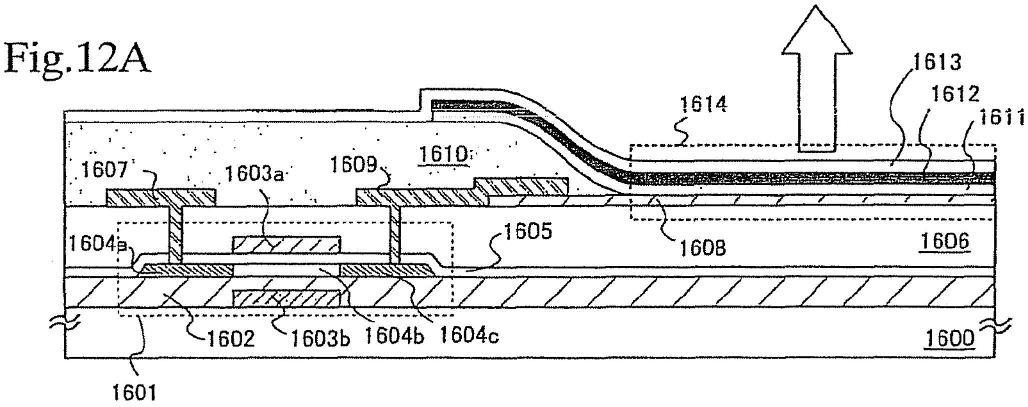
FIGS. 12A-12B are cross-sectional views showing a pixel structure of the display device of the present invention.

In FIG. 12A, a TFT 1601 is formed on a pixel substrate 1600. The driving TFT 1601 is a dual-gate TFT that has a first gate electrode 1603*a*, a second gate electrode 1603*b*, and a channel formation region 1604*b*. The channel formation region 1604*b* is sandwiched between insulating films 1602 and 160 which are sandwiched between the first and second gate electrodes. The TFT 1601 has a source region and a drain region, and one of which is denoted by 1604*a* and the other of which is denoted by 1604*c*. After the TFT 1601 is formed, an interlayer film 1606 is formed.

The structure of the TFT 1601 is not limited to the one shown in the drawing. A TFT with any known structure can be employed as the TFT 1601.

Formed next is a transparent conductive film, typically an ITO film, which is then patterned into a desired shape to obtain a pixel electrode 1608. The pixel electrode 1608 here serves as an anode. Contact holes reaching the source region and drain region, namely 1604*a* and 1604*c*, of the TFT 1601 are formed in the interlayer film 1606. A laminate consisting of a Ti layer, an Al layer containing Ti, and another Ti layer is formed and patterned into a desired shape to obtain wiring lines 1607 and 1609. The TFT is made conductive by contacting the wiring line 1609 to the pixel electrode 1608.

Then, an insulating film is formed from an organic resin material such as acrylic. An opening is formed in the insulating film at a position that coincides with the position of the pixel electrode 1608 of an OLED element 1614 to obtain an insulating film 1610. The opening has to be formed to have side walls tapered gently in order to avoid degradation or discontinuation of the OLED layer due to the level difference in side walls of the opening.

An OLED layer 1611 is formed next. Thereafter, an opposite electrode (cathode) 1612 of the OLED element 1614 is formed from a laminate consisting of a cesium (Cs) film with 2 nm or less in thickness and a silver (Ag) film with 10 nm or less in thickness which are layered in order. If the opposite electrode 1612 of the OLED element 1614 is very thin, light generated in the OLED layer 1611 is transmitted through the opposite electrode 1612 and emitted in the opposite direction to the pixel substrate 1600. Next, a protective film 1613 is formed in order to protect the OLED element 1614.

In the display device that emits light in the opposite direction to the pixel substrate 1600, it is not necessary that light emitted from the OLED element 1614 to be viewed travels through the elements formed over the pixel substrate 1600, including the driving TFT 1601. Therefore, the display devices can have a large aperture ratio.

The pixel electrode 1608 may serve as a cathode while the opposite electrode 1612 serves as an anode if TiN or the like is used to form the pixel electrode and a transparent conductive film such as an ITO film is used for the opposite electrode. Then, light generated in the OLED layer 1611 can be emitted from the anode side in the opposite direction to the pixel substrate 1600.

Figure 12B:
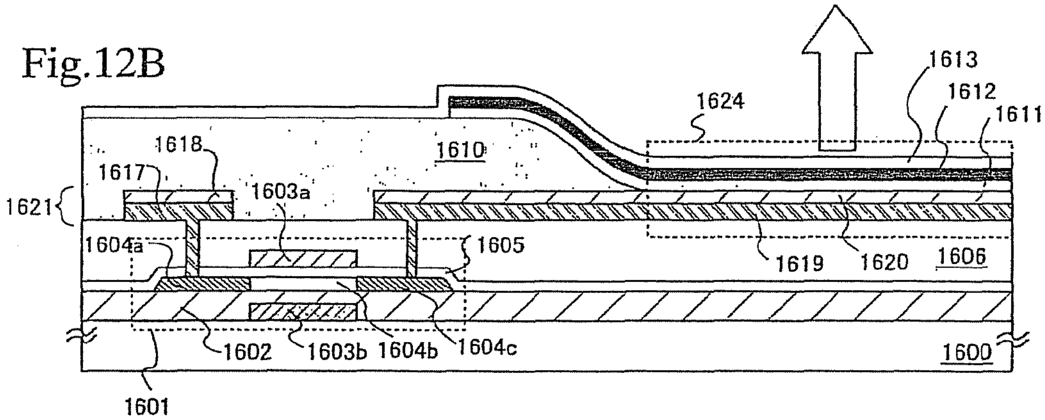

FIG. 12B is a sectional view showing the structure of a pixel that has an OLED element structured differently from FIG. 12A.

Components in FIG. 12B that are identical with those in FIG. 12A are denoted by the same reference symbols in the explanation.

The pixel of FIG. 12B is formed in accordance with the same process as that for the pixel of FIG. 12A up to forming the driving TFT 1601 and the interlayer film 1606.

Next, contact holes reaching the source region and drain region, 1604*a* and 1604*c*, of the driving II-T are fixated in the interlayer film 1606. Thereafter, a laminate consisting of a Ti layer, an Al layer containing Ti, and another Ti layer is formed, and a transparent conductive film, typically an ITO film, is formed in succession. The laminate and the transparent conductive film are patterned into desired shapes to obtain wiring lines 1621 and 1619 and a pixel electrode 1620. The wiring line 1621 is composed of 1617 and 1618. The pixel electrode 1620 serves as an anode of an OLED element 1624.

Then, an insulating film is formed from an organic resin material such as acrylic. An opening is formed in the insulating film at a position that coincides with the position of the pixel electrode 1620 of the OLED element 1624 to obtain the insulating film 1610. The opening has to be formed to have side walls tapered gently in order to avoid degradation or discontinuation of the OLED layer due to the level difference in side walls of the opening.

The OLED layer 1611 is formed next. Thereafter, an opposite electrode (cathode) 1612 of the OLED element 1624 is formed from a laminate consisting of a cesium (Cs) film with 2 nm or less in thickness and a silver (Ag) film with 10 nm or less in thickness which are layered in order. If the opposite electrode 1612 of the OLED element 1624 is very thin, light generated in the OLED layer 1611 is transmitted through the opposite electrode 1612 and emitted in the opposite direction to the pixel substrate 1600. Next, the protective film 1613 is formed in order to protect the OLED element 1624.

In the display device that emits light in the opposite direction to the pixel substrate 1600, it is not necessary that light emitted from the OLED element 1624 to be viewed travels through the elements formed over the pixel substrate 1600, including the driving TFT 1601. Therefore, the display devices can have a large aperture ratio.

The pixel electrode 1620 and the wiring line 1621 may serve as a cathode while the opposite electrode 1612 serves as an anode if TiN or the like is used to form the pixel electrode and a transparent conductive film such as an ITO film is used for the opposite electrode. Then, light generated in the OLED layer 1611 can be emitted from the anode side in the opposite direction to the pixel substrate 1600.

In this case, it is necessary to structure the TFT for making current flow to an OLED element in the display device of the present invention by using p-type.

Compared to the pixel with the structure as shown in FIG. 12A, the pixel with the structure as shown in FIG. 12B can reduce the number of photo masks required in the manufacturing process and can simplify the process since the wiring line 1619, which is connected to the source region or drain region of the driving TFT, and the pixel electrode 1620 can be patterned by using the same photo mask.

As mentioned above, it is possible to obtain clear display with little unevenness according to the present invention by using the current-voltage conversion circuit, the voltage-current conversion circuit, and the holding means. In addition, the display device manufactured with a few manufacturing steps can be provided by using the thin film transistor with a single polarity, particularly an n-type.

What is claimed is:

1. A semiconductor device comprising:
- a first line;
- a second line; and
- a pixel comprising:
  - a first transistor;
  - a second transistor;
  - a third transistor;
  - a fourth transistor; and
  - a pixel electrode,
- wherein a first terminal of the first transistor is directly connected to the pixel electrode,
- wherein a second terminal of the first transistor is electrically connected to the first line,
- wherein a gate of the first transistor is electrically connected to a first terminal of the second transistor,
- wherein a second terminal of the second transistor is electrically connected to a first terminal of the third transistor,
- wherein a gate of the second transistor is electrically connected to the second line,
- wherein a gate of the third transistor is electrically connected to the second line, wherein a first terminal of the fourth transistor is directly connected to the pixel electrode, wherein a second terminal of the fourth transistor is electrically connected to the second terminal of the second transistor, and wherein a gate of the fourth transistor is electrically connected to the gate of the first transistor.

2. The semiconductor device according to claim 1, further comprising a light emitting layer over the pixel electrode and a counter electrode over the light emitting layer.

3. The semiconductor device according to claim 2, further comprising a protective film over the counter electrode.

4. A display module comprising a semiconductor device according to claim 1 and an FPC.

5. A semiconductor device comprising:

a first line;

a second line; and a pixel comprising:

a first transistor;

a second transistor;

a third transistor;

a fourth transistor; and a pixel electrode, wherein a first terminal of the first transistor is directly connected to the pixel electrode, wherein a second terminal of the first transistor is electrically connected to the first line, wherein a gate of the first transistor is electrically connected to a first terminal of the second transistor, wherein a second terminal of the second transistor is electrically connected to a first terminal of the third transistor, wherein a gate of the second transistor is electrically connected to the second line, wherein a gate of the third transistor is electrically connected to the second line, wherein a first terminal of the fourth transistor is directly connected to the pixel electrode, wherein a second terminal of the fourth transistor is electrically connected to the second terminal of the second transistor, wherein a gate of the fourth transistor is electrically connected to the gate of the first transistor, and wherein the first line is configured to supply a constant voltage to the first transistor.

6. The semiconductor device according to claim 5, further comprising a light emitting layer over the pixel electrode and a counter electrode over the light emitting layer.

7. The semiconductor device according to claim 6, further comprising a protective film over the counter electrode.

8. A display module comprising a semiconductor device according to claim 5 and an FPC.

9. A semiconductor device comprising:

a first line;

a second line;

a third line; and a pixel comprising:

a first transistor;

a second transistor;

a third transistor;

a fourth transistor; and a pixel electrode, wherein a first terminal of the first transistor is directly connected to the pixel electrode, wherein a second terminal of the first transistor is electrically connected to the first line, wherein a gate of the first transistor is electrically connected to a first terminal of the second transistor, wherein a second terminal of the second transistor is electrically connected to a first terminal of the third transistor, wherein a gate of the second transistor is electrically connected to the second line, wherein a second terminal of the third transistor is electrically connected to the third line, wherein a gate of the third transistor is electrically connected to the second line, wherein a first terminal of the fourth transistor is directly connected to the pixel electrode, wherein a second terminal of the fourth transistor is electrically connected to the second terminal of the second transistor, wherein a gate of the fourth transistor is electrically connected to the gate of the first transistor, and wherein the third line is configured to supply a current to the pixel through the third transistor.

10. The semiconductor device according to claim 9, further comprising a light emitting layer over the pixel electrode and a counter electrode over the light emitting layer.

11. The semiconductor device according to claim 10, further comprising a protective film over the counter electrode.

12. A display module comprising a semiconductor device according to claim 9 and an FPC.

* * * * *